US012248271B2

(12) United States Patent
Usui et al.

(10) Patent No.: US 12,248,271 B2
(45) Date of Patent: Mar. 11, 2025

(54) COUPLING METHOD

(71) Applicant: CANON KABUSHIKI KAISHA, Tokyo (JP)

(72) Inventors: Toshiro Usui, Ibaraki (JP); Takahiro Kobayashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/503,231

(22) Filed: Nov. 7, 2023

(65) Prior Publication Data

US 2024/0077827 A1 Mar. 7, 2024

Related U.S. Application Data

(63) Continuation of application No. 17/941,457, filed on Sep. 9, 2022, now Pat. No. 11,841,667.

(30) Foreign Application Priority Data

Sep. 17, 2021 (JP) ................................ 2021-151978

(51) Int. Cl.
*G03G 15/00* (2006.01)

(52) U.S. Cl.
CPC .................................... *G03G 15/80* (2013.01)

(58) Field of Classification Search
CPC ............................... G03G 15/80; G03G 21/16
USPC ........................................................... 399/90
See application file for complete search history.

(56) References Cited

U.S. PATENT DOCUMENTS

2011/0116893 A1 5/2011 Hayashi et al.

FOREIGN PATENT DOCUMENTS

| | | | |
|---|---|---|---|
| EP | 4152103 | A1 | 3/2023 |
| JP | 2007073758 | A | 3/2007 |
| JP | 2017228624 | A | 12/2017 |

OTHER PUBLICATIONS

Extended European Search Report issued in European Appln. No. 22194538.9 mailed on Feb. 10, 2023.
Office Action issued U.S. Appl. No. 17/941,457 mailed Jul. 7, 2023.
Notice of Allowance issued U.S. Appl. No. 17/941,457 mailed Oct. 19, 2023.

*Primary Examiner* — Quana Grainger
(74) *Attorney, Agent, or Firm* — ROSSI, KIMMS & McDOWELL LLP

(57) ABSTRACT

A coupling structure is provided in an imager forming apparatus that forms an image on a recording material and configured to couple a first member and a second member. The second member includes a sheet metal having an insulative layer on a surface of a metal layer. A first conductive portion is formed in the first member. A second conductive portion includes a projection formed by press working in the second member. A coupling portion couples the first member and the second member in a state in which at least a part of the first conductive portion and at least a part of the second conductive portion are contacted with each other.

8 Claims, 30 Drawing Sheets

(a)

(b)

(a)

(b)

(a)

(b)

(a)

(b)

(a)

(b)

(a)

(b)

(c)

(a)

(b)

(a)

(b)

COUPLING METHOD

FIELD OF THE INVENTION AND RELATED ART

The present invention relates to a coupling structure for coupling sheet metal used in an image forming apparatus, and to an image forming apparatus equipped with such a structure.

In the past, in image forming apparatuses, including communication devices such as FAX machines and copy machines, as well as various electronic devices, conductive metal parts such as sheet metal are used to assemble the framework that serves as the base of the device casing.

In recent years, Electro-Magnetic Interference (EMI) factors in electronic circuit boards, which are equipped with various communication standards (Ethernet, Wi-Fi, Bluetooth, USB, etc.) and operate at various frequencies, such as faster CPU operating frequencies, have become more complex. These improvements in information processing and communication functions have led to an increase in power consumption, and power supplies for electronic circuits are becoming increasingly low-voltage in order to achieve power savings. However, circuits that operate at low voltages have low signal amplitude voltages, and even the application of static electricity, which was not a problem in the past, can cause malfunctions, resulting in a relatively large impact due to ESD (Electro-Static Discharge). Therefore, countermeasures against EMI and ESD for electronic circuit boards, which are becoming more and more sophisticated these days, have become extremely difficult. It is essential to take countermeasures not only for electronic circuit boards but also for the entire equipment system, including conductive metal parts such as sheet metal.

Sheet metal has a layered structure to increase its rigidity and workability of sheet metal. Currently, the main type of sheet metal for conductive metal parts is steel sheet with a resin coat layer (chrome-free steel sheet). This resin-coated layer is an insulating film of about several μm, which gives the sheet metal corrosion resistance, such as rust prevention. On the other hand, this insulating film impairs conductivity when connecting sheet metal to sheet metal (or sheet metal to an electronic circuit board), and is one of the factors preventing stable grounding. Therefore, even if a device appears to be covered with sheet metal, radiated noise may leak out and ESD resistance may be degraded.

In order to achieve stable grounding even when chrome-free steel plates are used, a grounding technique is used in which, when coupling two sheet metals using a screw member, the leading end of one sheet metal is slid across the other to remove the resin-coated layer of the other sheet metal, exposing the metal inside. (Japanese Laid-Open Patent Application No. 2007-73758)

However, in coupling structures such as Japanese Laid-Open Patent Application No. 2007-73758, in which the resin-coated layer is scraped off by sliding and the metal parts are connected, the degree of conduction may vary depending on the variation in the thickness of the resin-coated layer, and conduction may become unstable. Therefore, grounding by stable coupling may not be realized.

The present invention aims to provide a coupling structure and image forming apparatus that can realize electrically stable grounding in a coupling structure between sheet metals used in an image forming apparatus.

SUMMARY OF THE INVENTION

The present invention relates to a coupling structure provided in an image forming apparatus that forms an image on a recording material based on an image information and configured to couple a first member and a second member including a sheet metal having an insulative layer on a surface of a metal layer, the coupling structure comprising: a first conductive portion formed in the first member; a second conductive portion including a projection formed by press working in the second member; and a coupling portion configured to couple the first member and the second member in a state in which at least a part of the first conductive portion and at least a part of the second conductive portion are contacted with each other.

In addition, the present invention describes an image forming apparatus comprising: a main assembly including an image forming portion that form an image on a recording material based on an image information; an electric component box attached to a side plate of the main assembly and configured to house a control substrate that controls the image forming apparatus; and a coupling structure configured to couple the side plate of the main assembly and the electric component box in a state in which at least a part of a first conductive portion formed in the side plate and at least a part of a second conductive portion including a projection formed by press working in the electric component box are contacted with each other.

The present invention also describes an image forming apparatus comprising: a main assembly including an image forming portion that form an image on a recording material based on an image information; an electric component box attached to a side plate of the main assembly and configured to house a control substrate that controls the image forming apparatus; and a coupling structure configured to couple the side plate of the main assembly and the electric component box in a state in which at least a part of a first conductive portion including a projection formed by press working in the electric component box and at least a part of a second conductive portion formed in the side plate are contacted with each other.

In addition, the present invention describes an image forming apparatus comprising: a main assembly including an image forming portion that forms an image on a recording material based on an image information; an electric component box attached to a side plate of the main assembly and configured to house a control substrate that controls the image forming apparatus; and a coupling structure configured to couple the control substrate and the electric component box in a state in which at least a part of a first conductive portion formed in the control substrate and at least a part of a second conductive portion including a projection formed by press working in the electric component box are contacted with each other.

Further, the present invention describes an image forming apparatus comprising: a main assembly including an image forming portion that form an image on a recording material based on an image information; an electric component box attached to a side plate of the main assembly and configured to house a control substrate that controls the image forming apparatus; and a coupling structure configured to couple the control substrate and the electric component box in a state in which at least a part of a first conductive portion including a projection formed by press working in the control substrate and at least a part of a second conductive portion formed in the electric component box are contacted with each other.

Further features of the present invention will become apparent from the following description of exemplary embodiments (with reference to the attached drawings).

Figure 7:
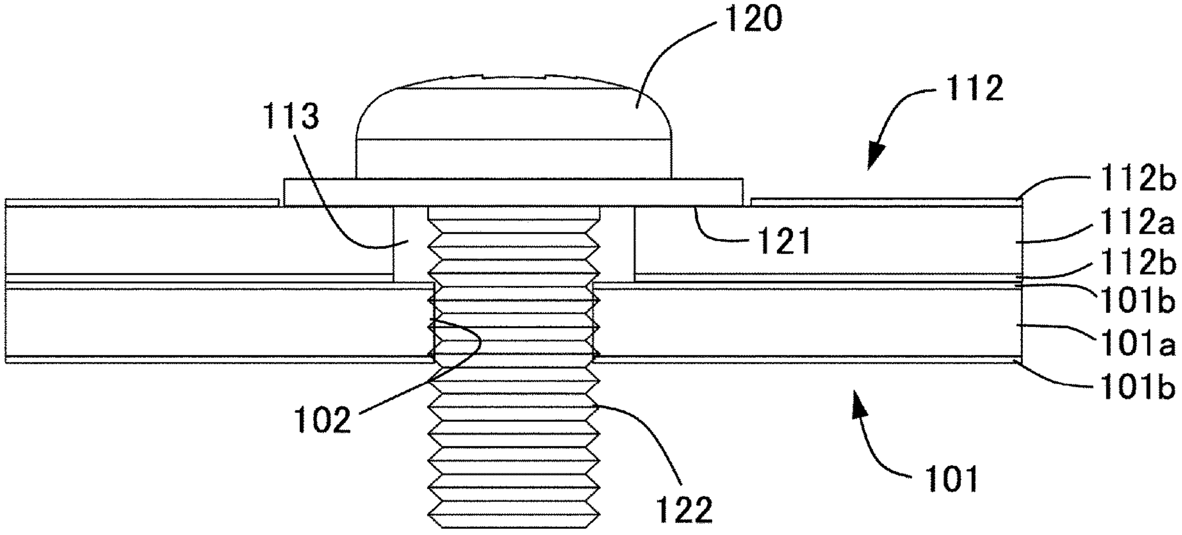
Figure 7:
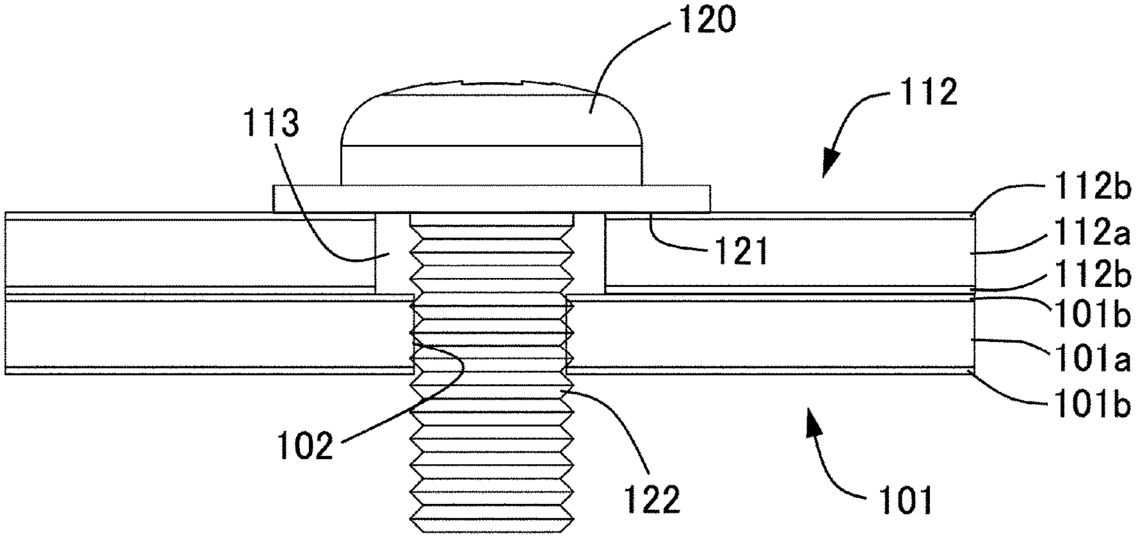

Part (a) of FIG. 7 is a cross-sectional drawing showing a coupling structure of a conventional rear side plate and box sheet metal when conduction is possible, and part (b) of FIG. 7 is a cross-sectional drawing showing a coupling structure of a conventional rear side plate and box sheet metal when conduction is not possible.

Figure 8:
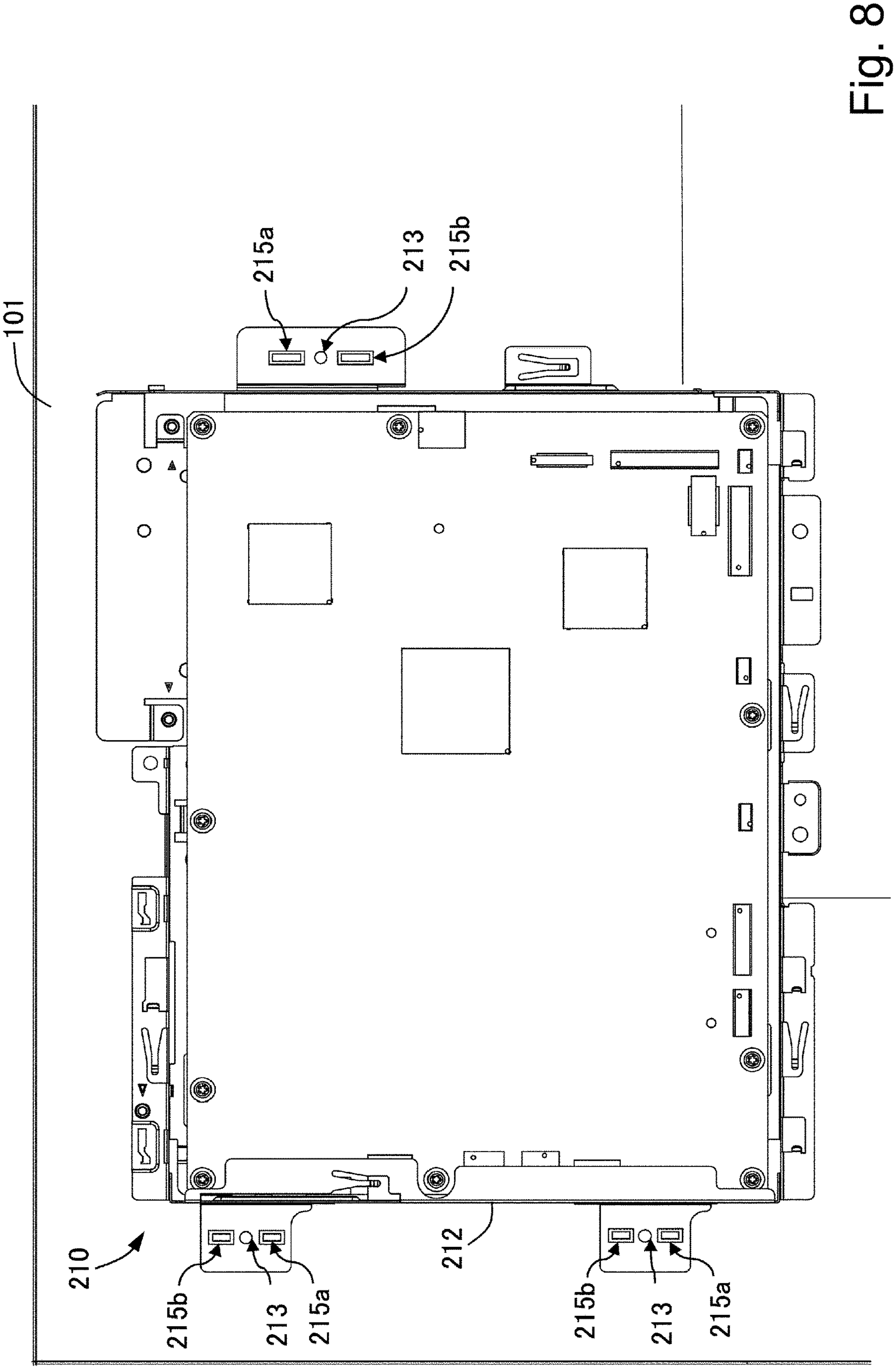

FIG. 8 is an enlarged rear view of an installation of a box sheet metal and a rear side plate according to the first embodiment.

Figure 9:
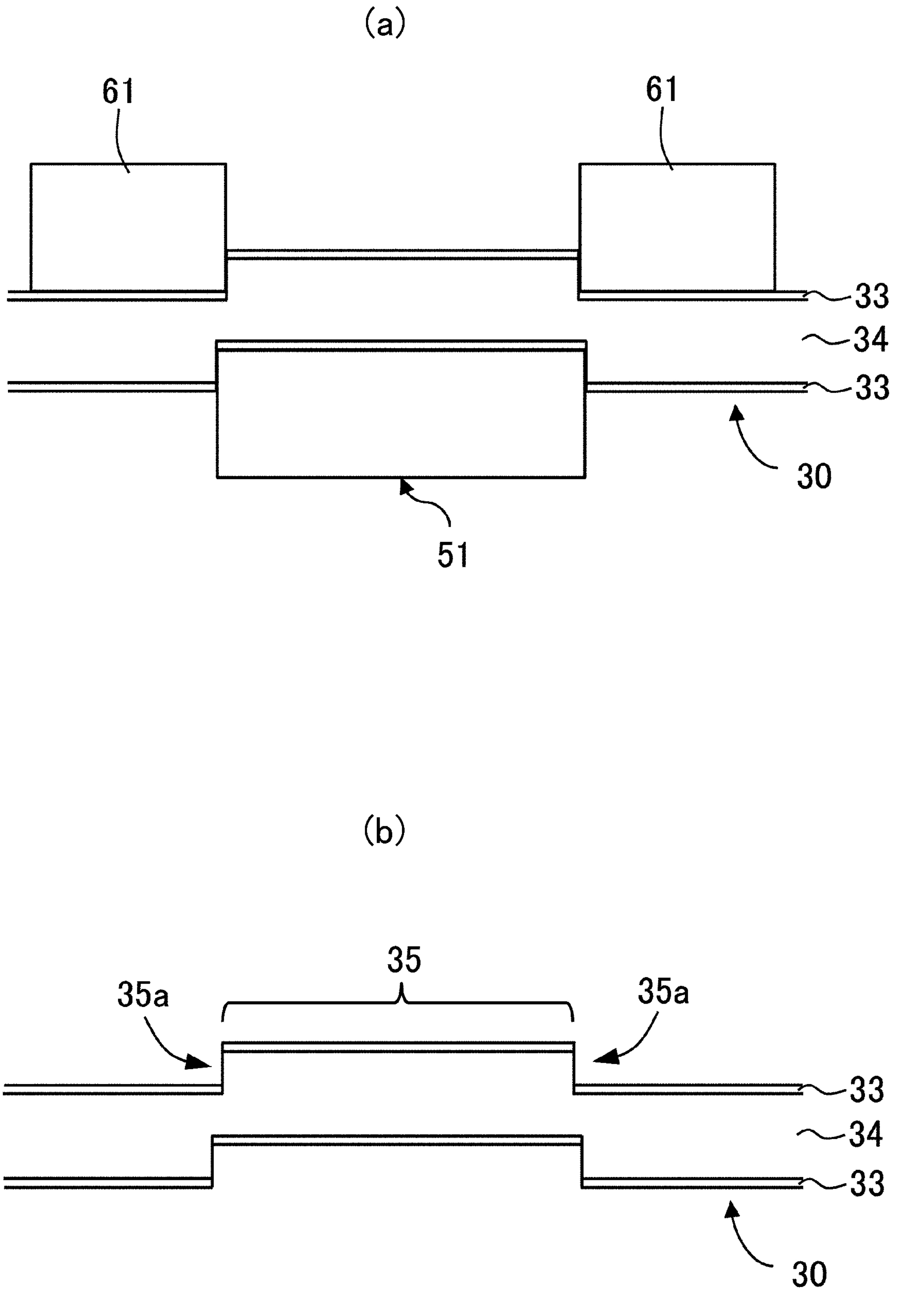

FIG. 9 is a cross-sectional drawing showing a process of forming a projection on an electrogalvanized steel sheet. Part (a) of FIG. 9 shows the electrogalvanized steel sheet being press worked with a punch and a die as the first process, and part (b) of FIG. 9 shows the deformed electrogalvanized steel sheet.

Figure 10:
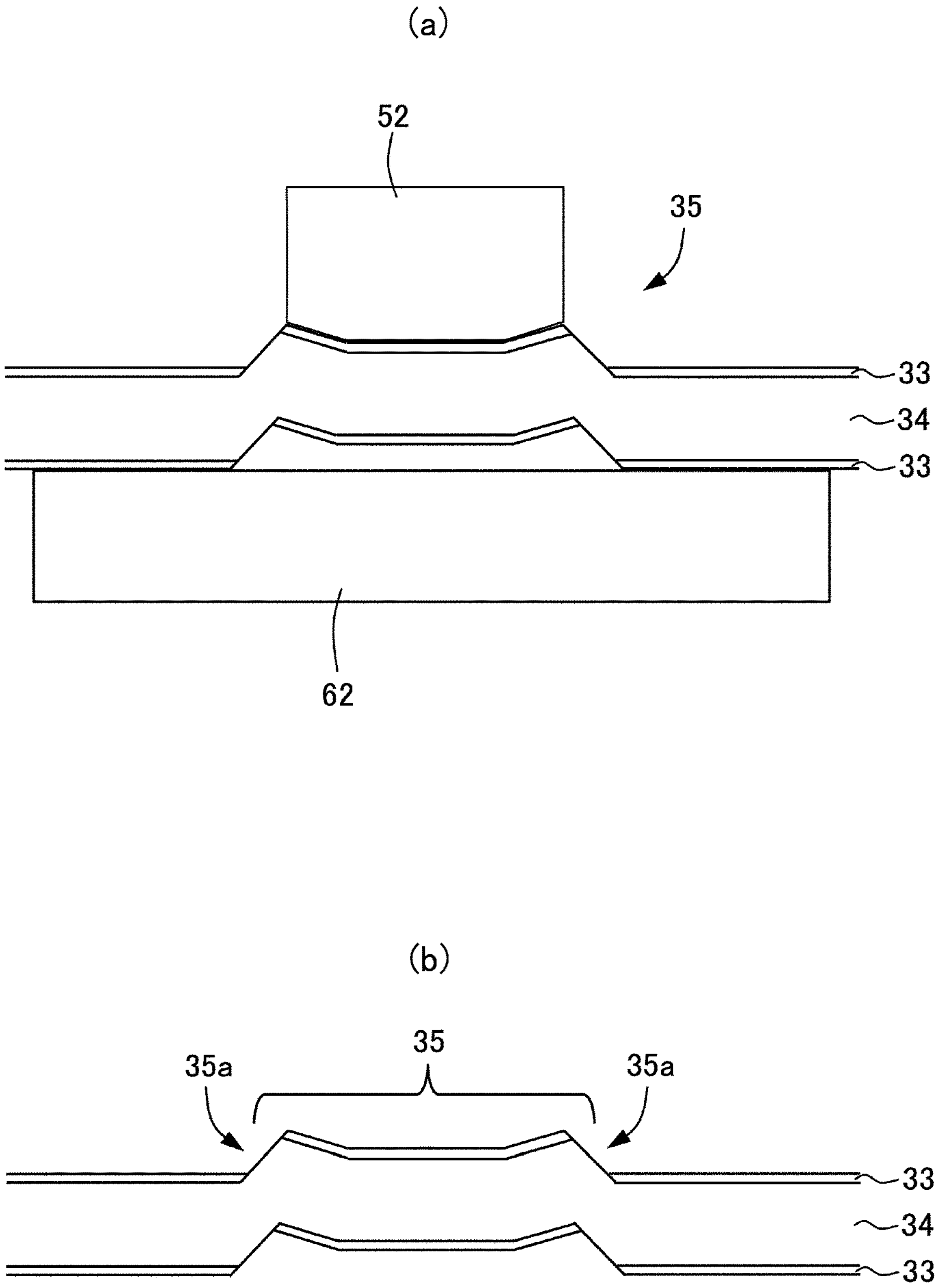

FIG. 10 is a cross-sectional drawing showing a process of forming a projection on an electrogalvanized steel sheet. Part (a) of FIG. 10 shows the electrogalvanized steel sheet being press worked with a punch and die as the second process, and part (b) of FIG. 10 shows the electrogalvanized steel sheet deformed by the press working.

Figure 11:
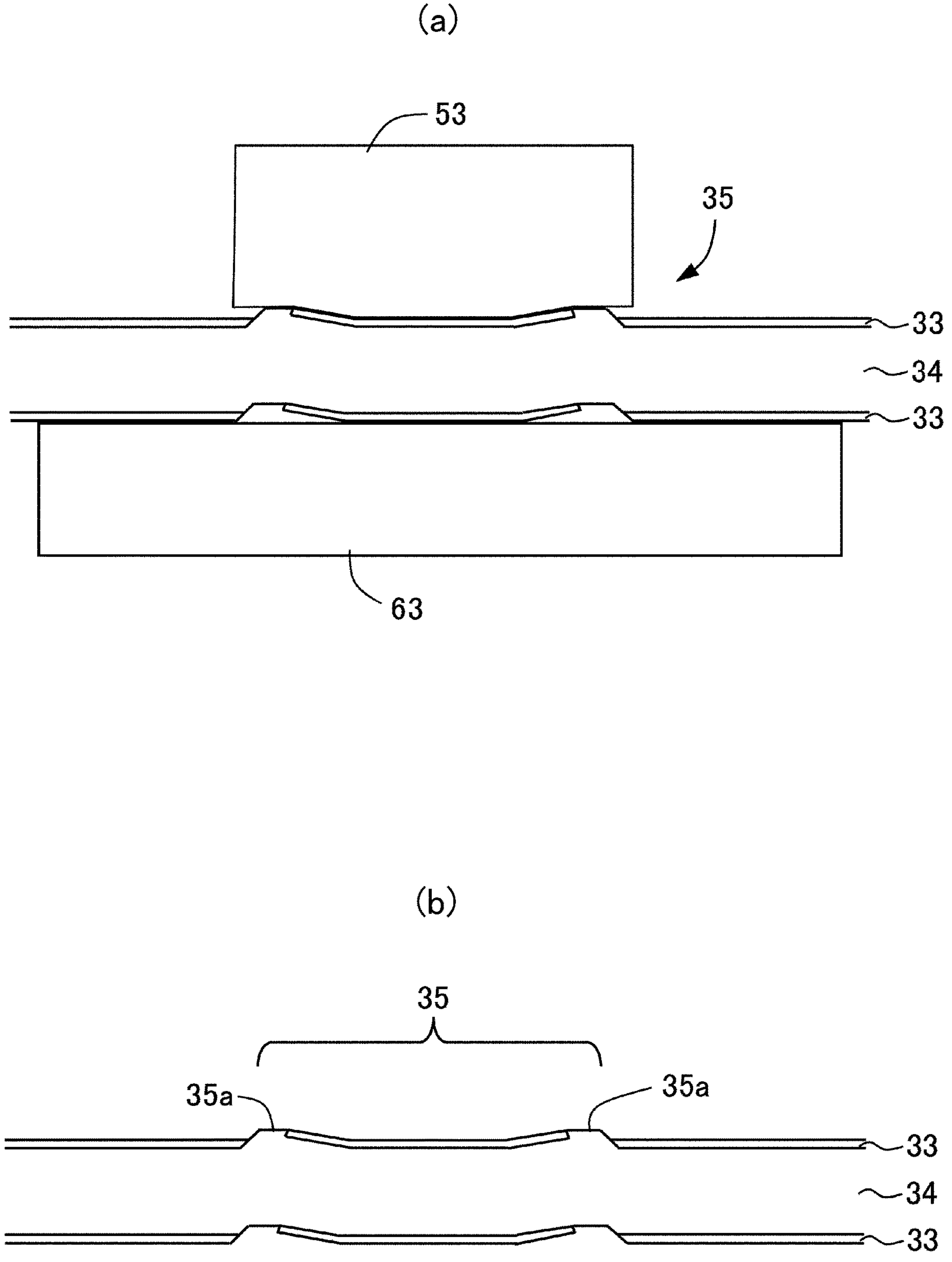

FIG. 11 is a cross-sectional drawing showing a process of forming a projection on an electrogalvanized steel sheet. Part (a) of FIG. 11 shows the electrogalvanized steel sheet being press worked with a punch and die as the third process, and part (b) of FIG. 11 shows the electrogalvanized steel sheet deformed by the press working.

Figure 12:
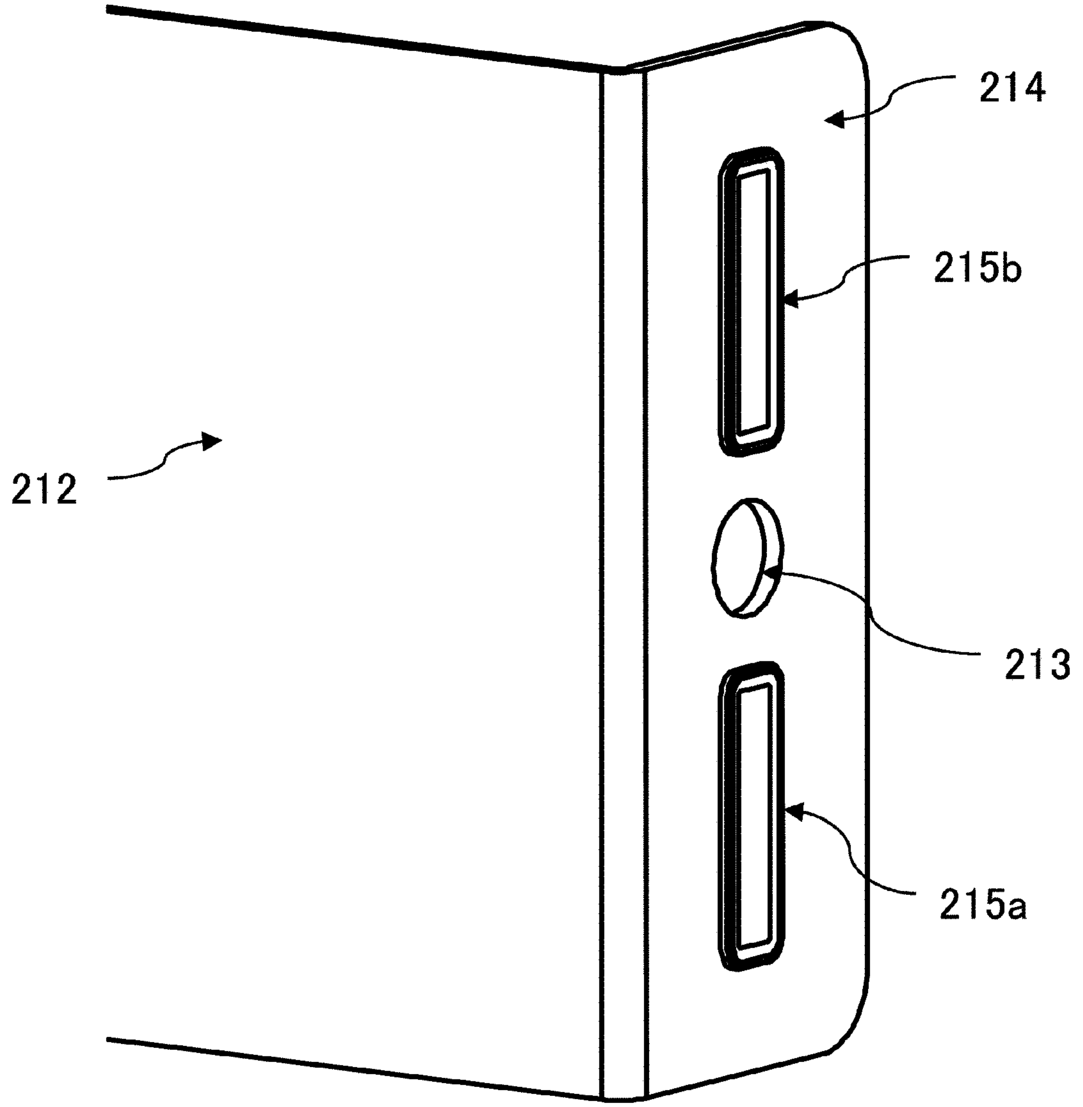

FIG. 12 is a schematic drawing showing a projection of the box sheet metal according to the first embodiment.

Figure 13:
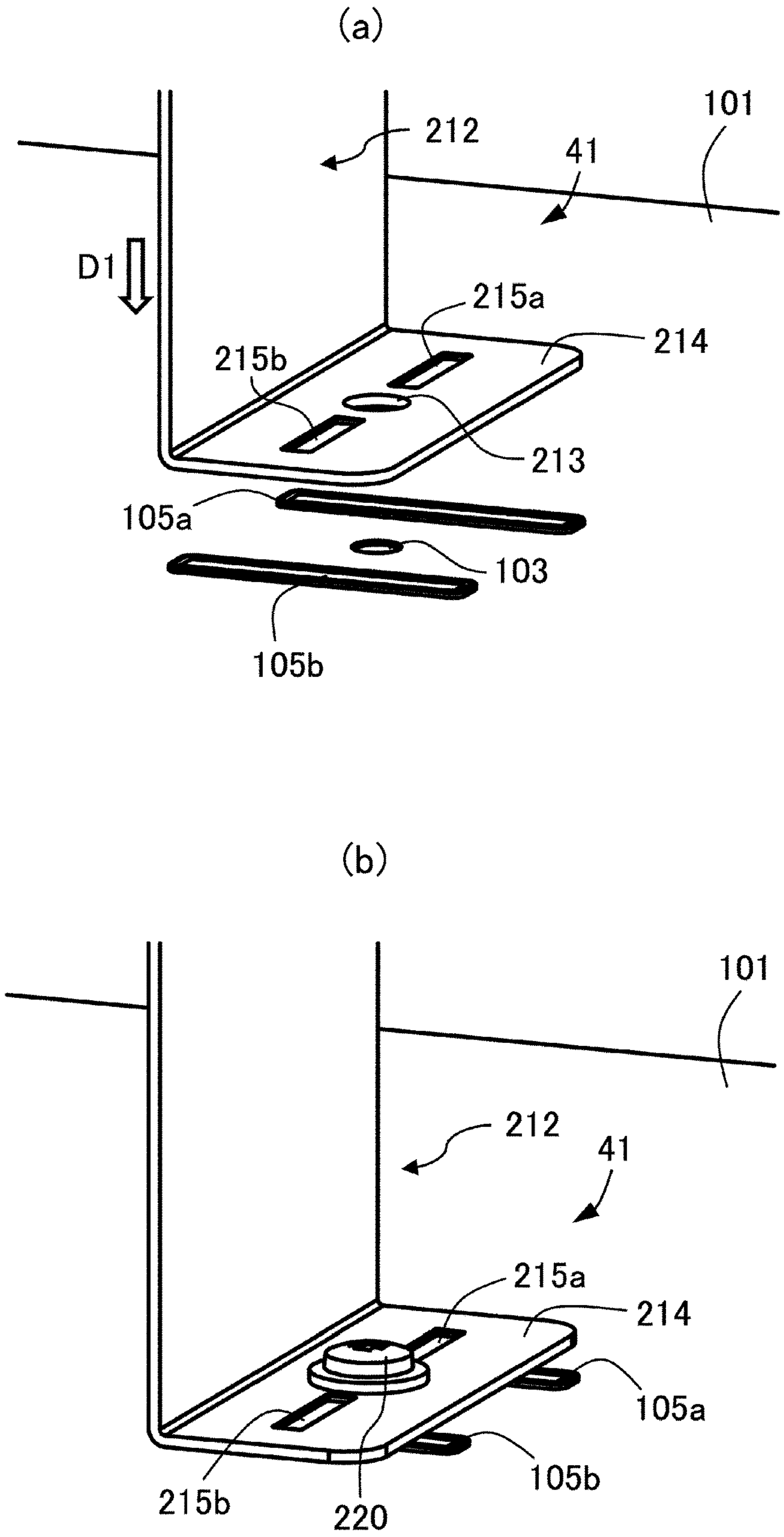

FIG. 13 is a schematic drawing showing the coupling structure according to the first embodiment, with part (a) of FIG. 13 showing it before installation, and part (b) of FIG. 13 showing it after installation.

Figure 14:
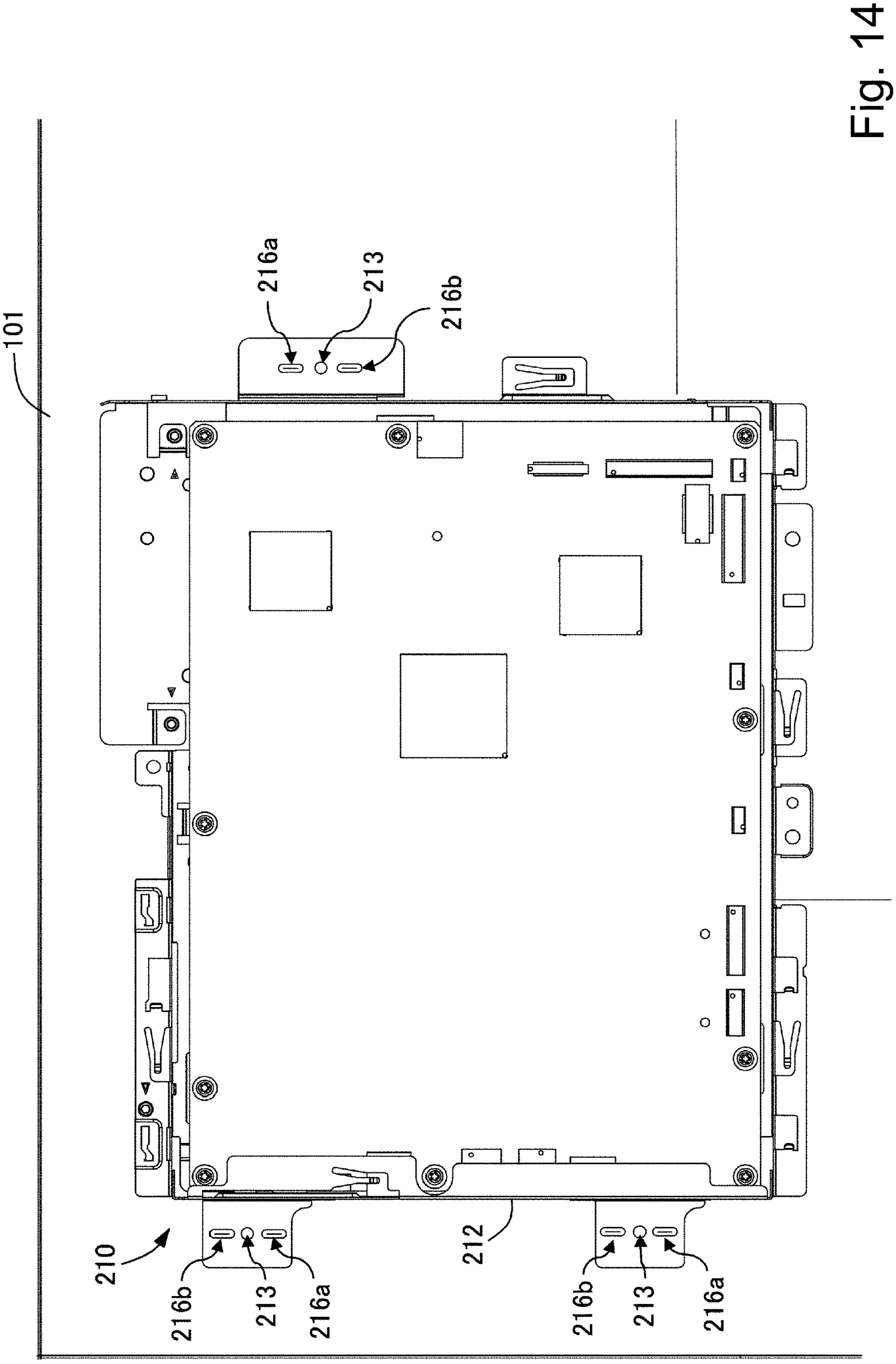

FIG. 14 is an enlarged rear view of an installation of a box sheet metal and a rear side plate according to the second embodiment.

Figure 15:
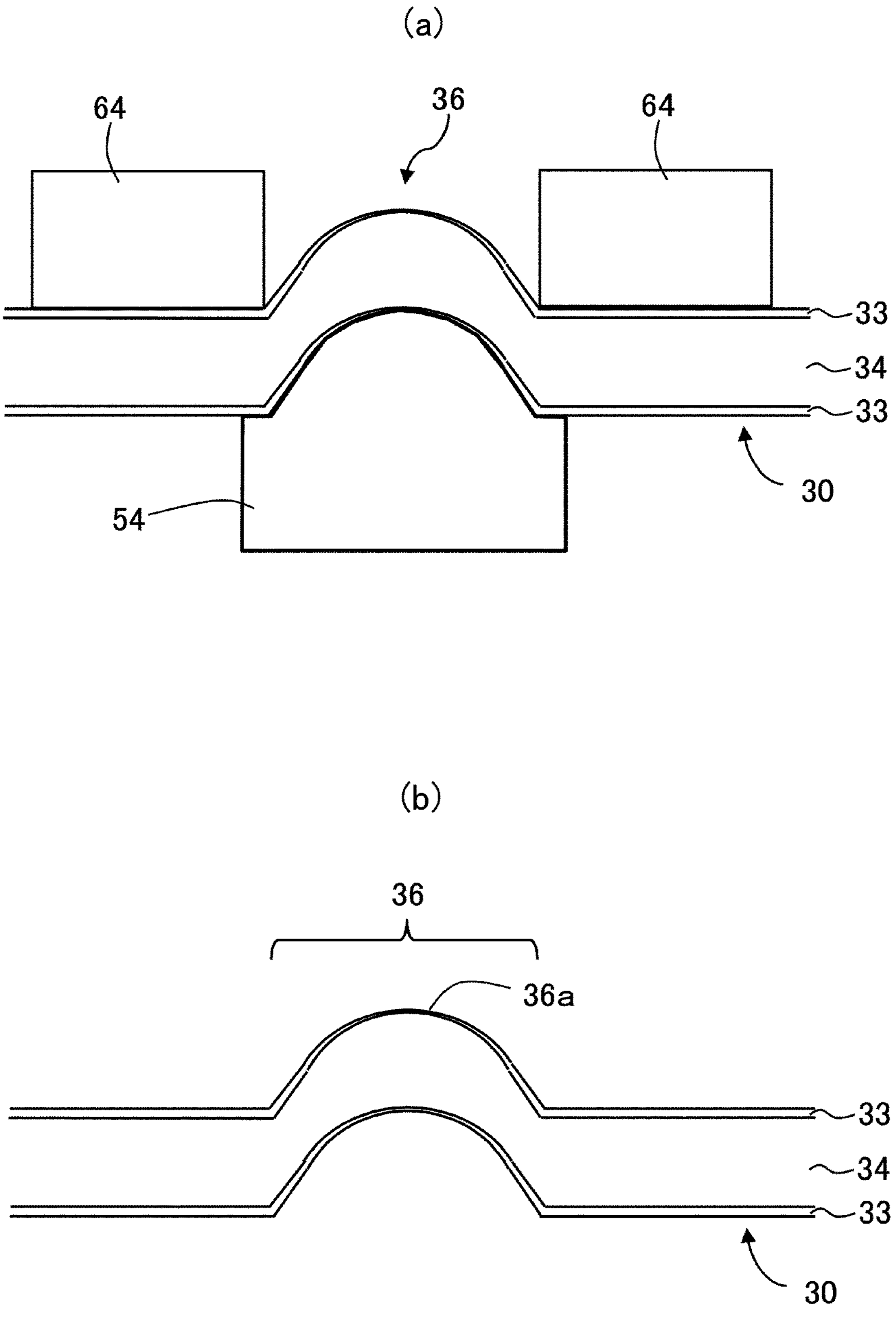

FIG. 15 is a cross-sectional drawing showing a process for forming a bead portion on an electrogalvanized steel sheet. Part (a) of FIG. 15 shows the electrogalvanized steel sheet being press worked using a punch and die, and part (b) of FIG. 15 shows the electrogalvanized steel sheet deformed by the press working process.

Figure 16:
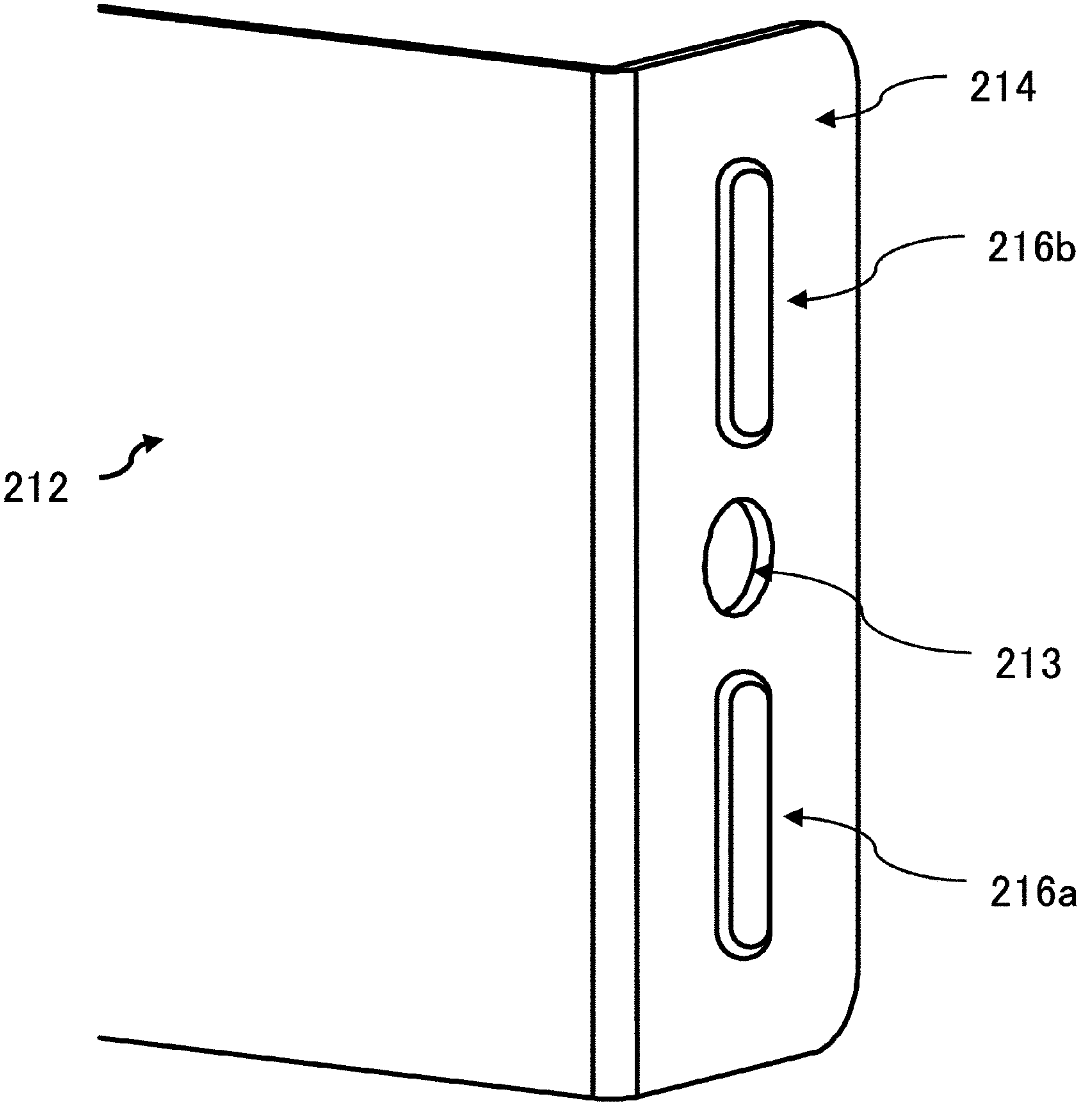

FIG. 16 is a schematic drawing showing a projection of a box sheet metal according to the second embodiment.

Figure 17:
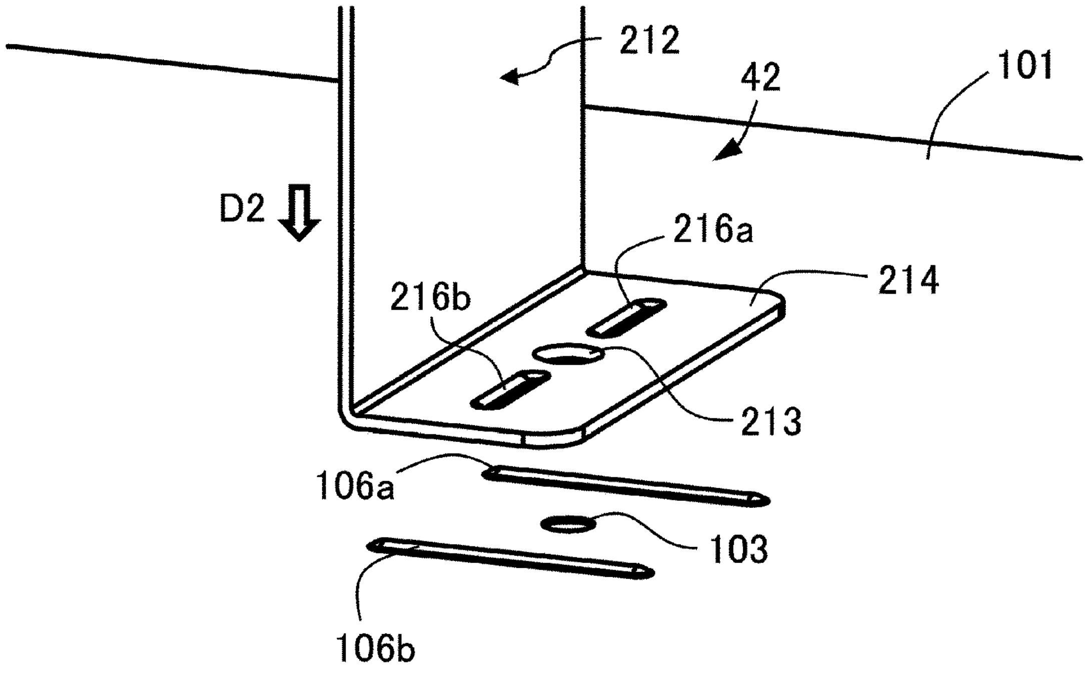
Figure 17:
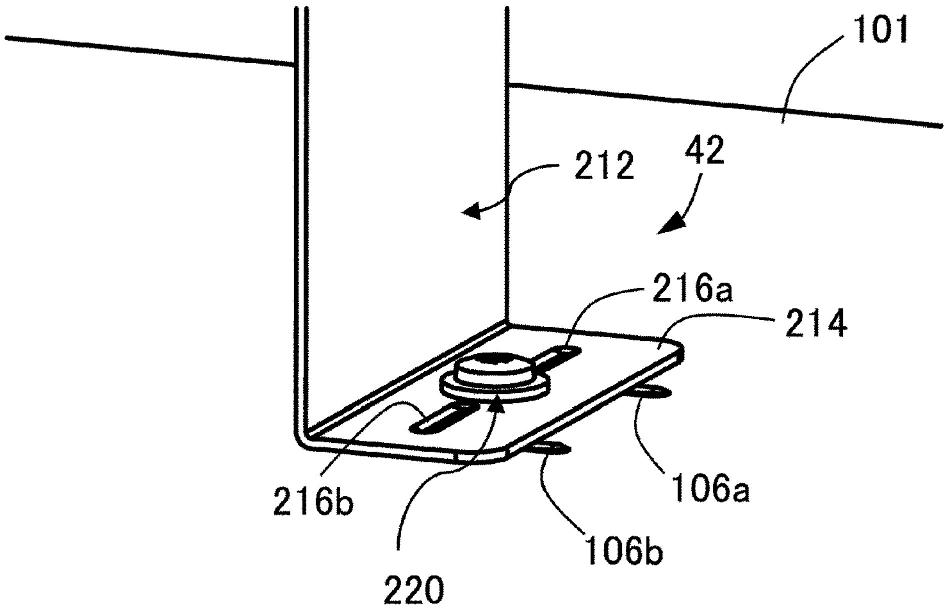

Part (a) of FIG. 17 is a schematic drawing showing a coupling structure according to the second embodiment before installation and part (b) of FIG. 17 is a schematic drawing showing the coupling structure according to the second embodiment after installation.

Figure 18:
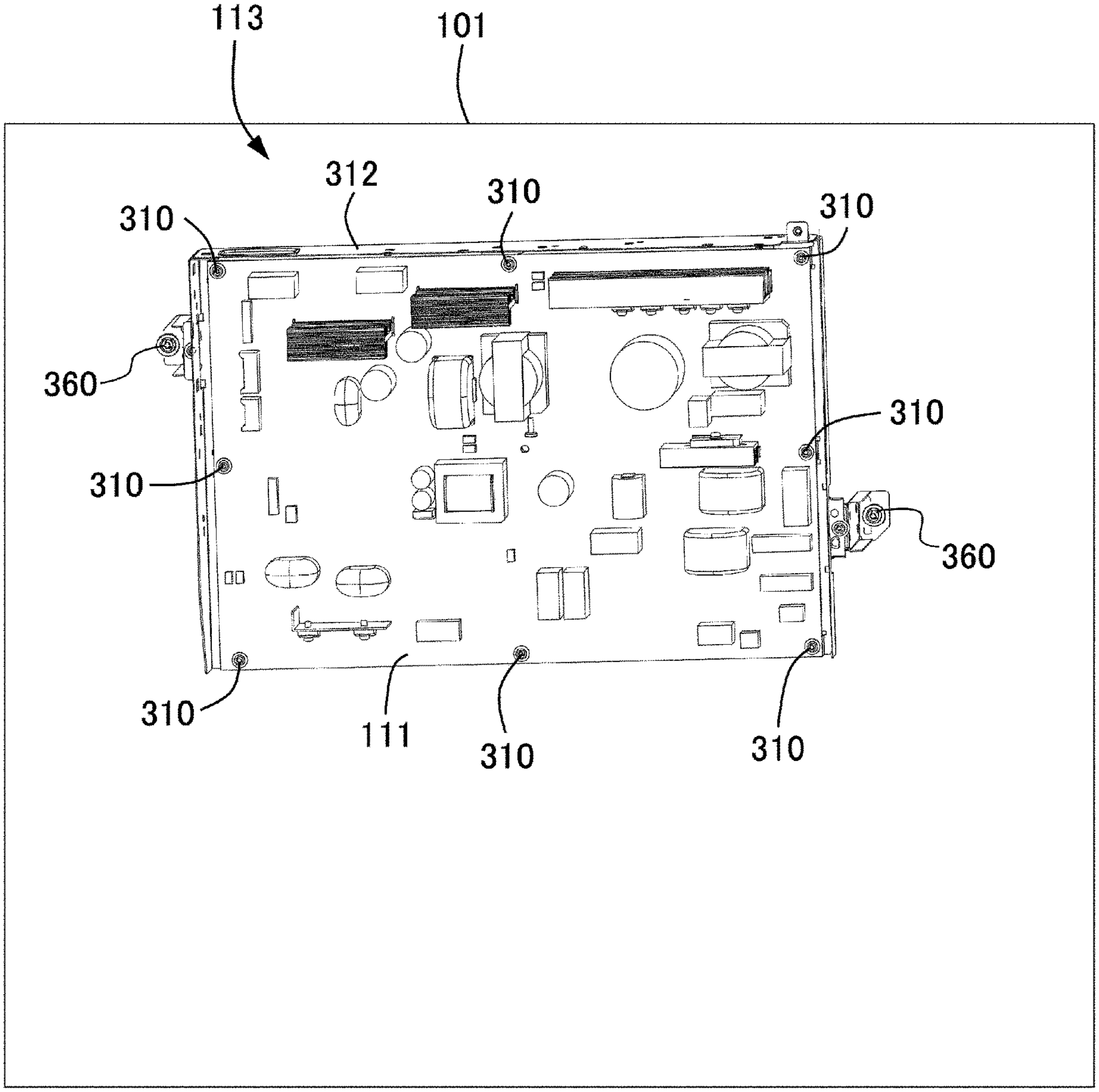

FIG. 18 is a rear view of an installation of the rear side plate, box sheet metal, and control substrate according to the third embodiment.

Figure 19:
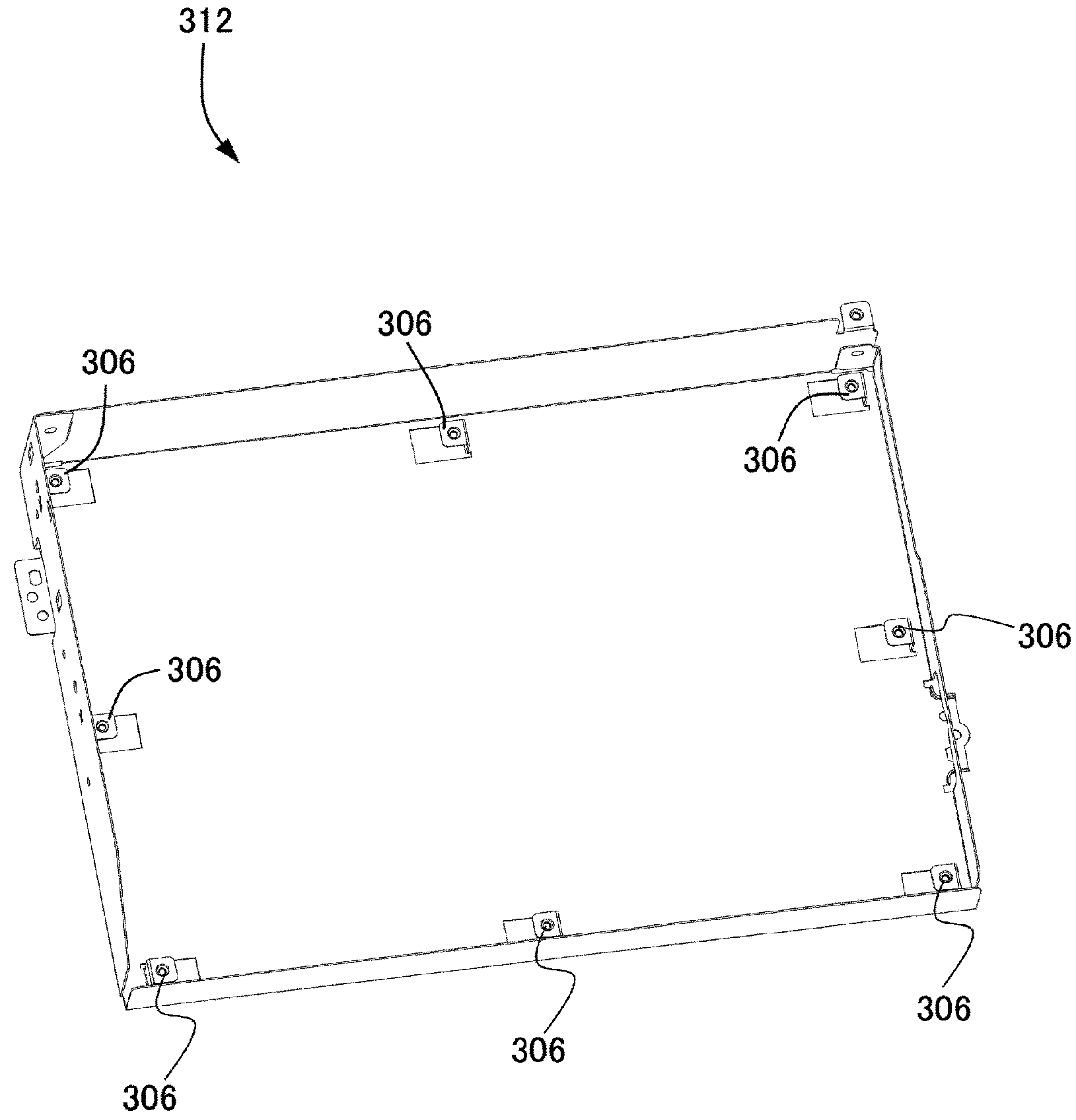

FIG. 19 is a schematic drawing of a conventional box sheet metal.

Figure 20:
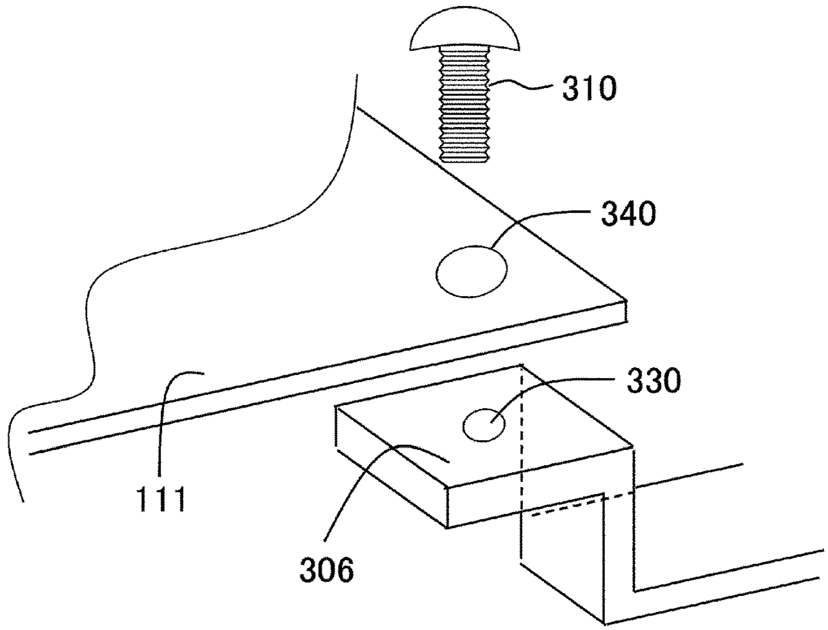
Figure 20:
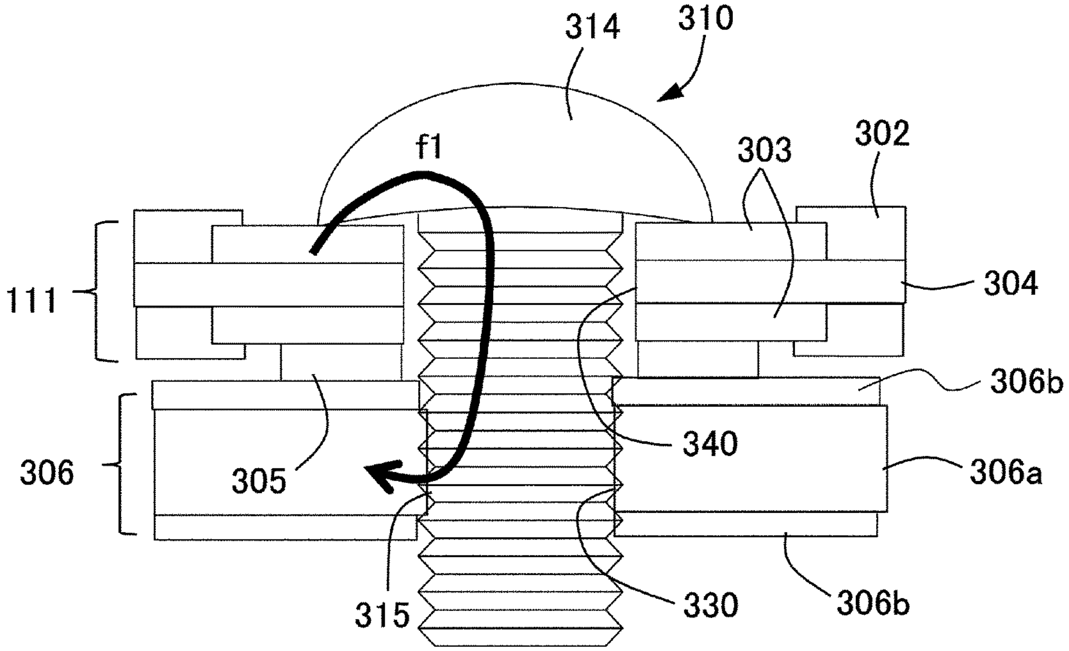

Part (a) of FIG. 20 is a schematic drawing of a conventional coupling structure of a box sheet metal and a control substrate, and part (b) of FIG. 20 is a cross-sectional drawing of a conventional coupling structure of a box sheet metal and a control substrate.

Figure 21:
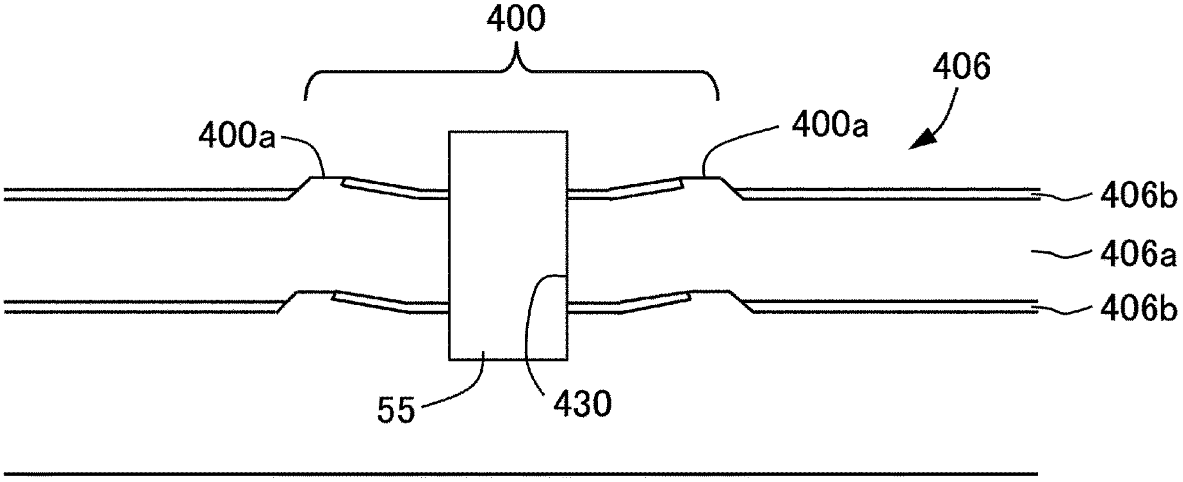
Figure 21:
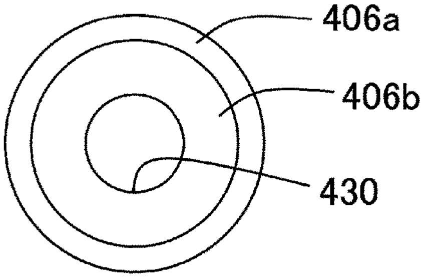

Part (a) of FIG. 21 is a cross-sectional drawing of the process of perforating a deformed electrogalvanized steel sheet, and part (b) of FIG. 21 is a two-dimensional drawing of the process of perforating a deformed electrogalvanized steel sheet.

Figure 22:
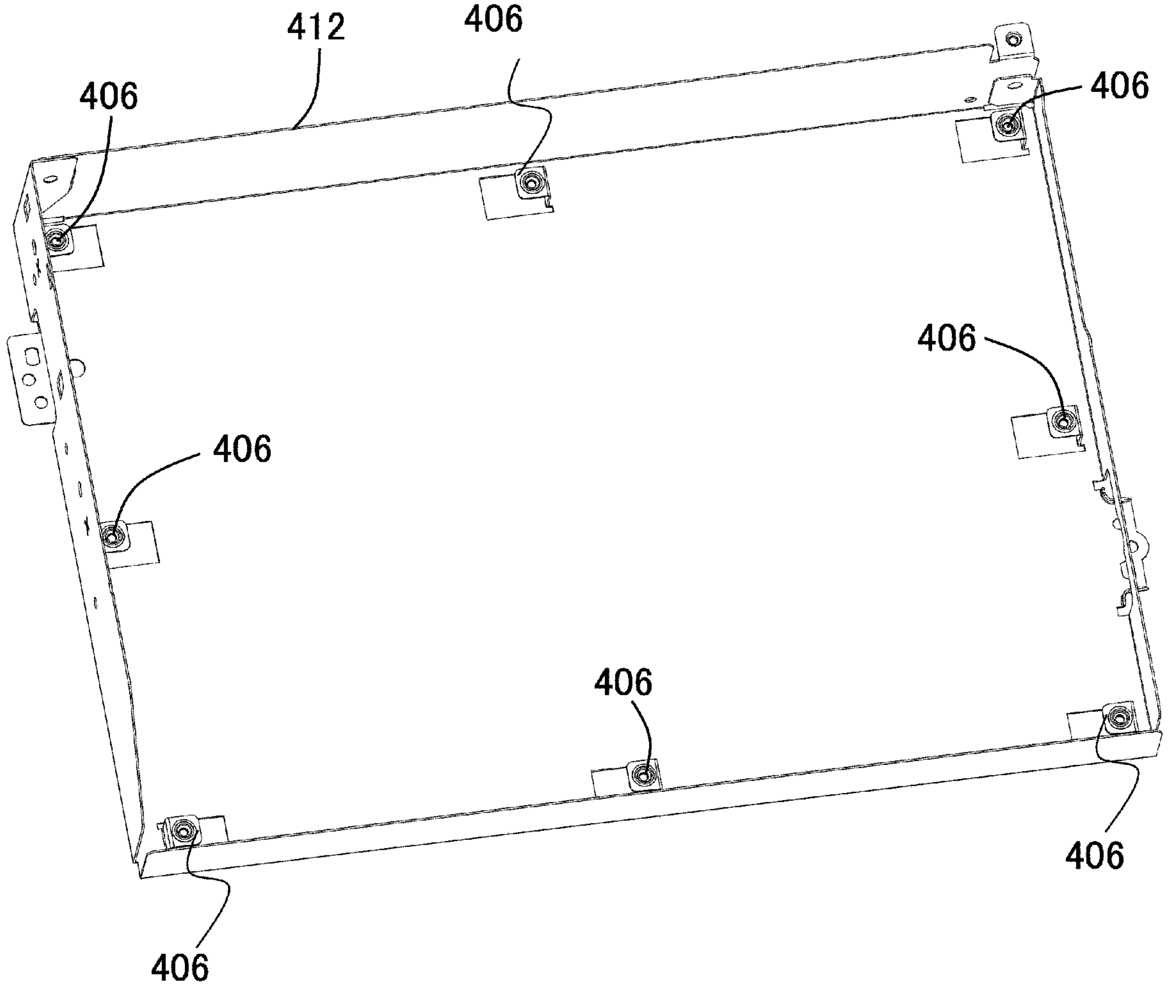

FIG. 22 is a schematic drawing showing a box sheet metal according to the third embodiment.

Figure 23:
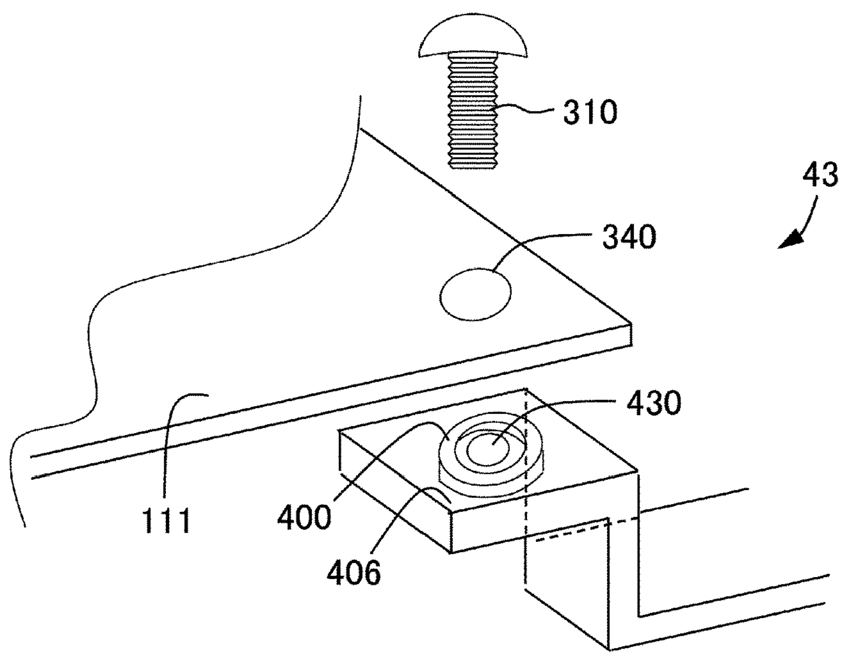
Figure 23:
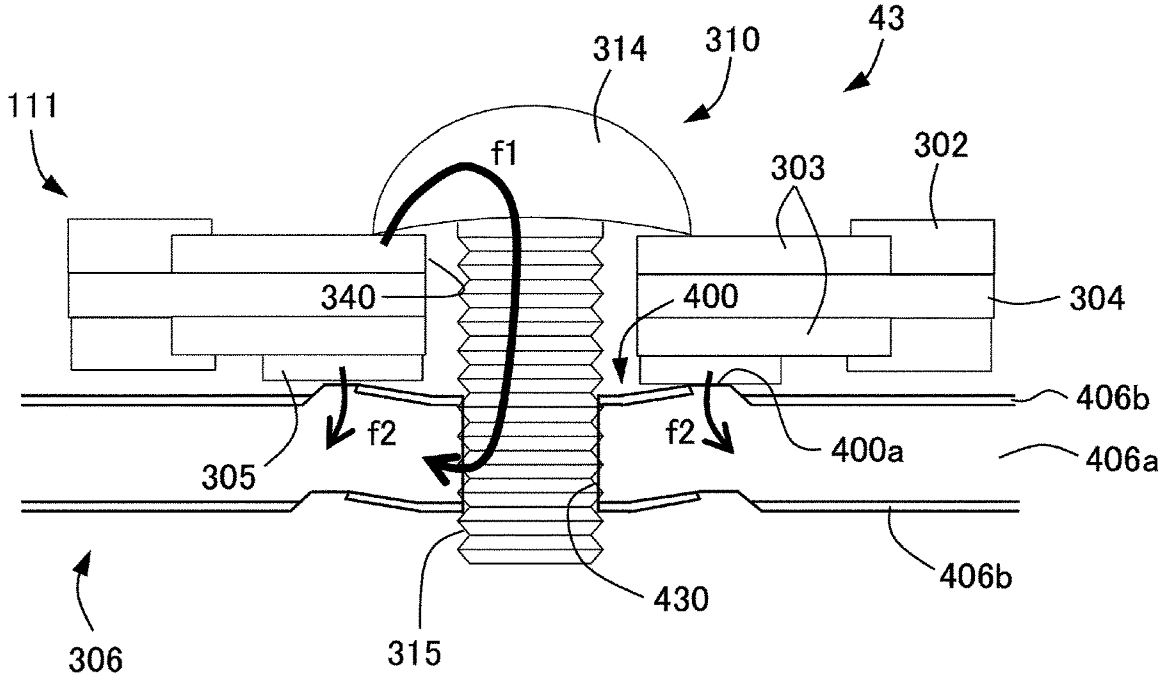

Part (a) of FIG. 23 is a schematic drawing of a coupling structure between a box sheet metal and a control substrate according to the third embodiment, and part (b) is a cross-sectional drawing of a coupling structure between a box sheet metal and a control substrate according to the third embodiment.

Figure 24:
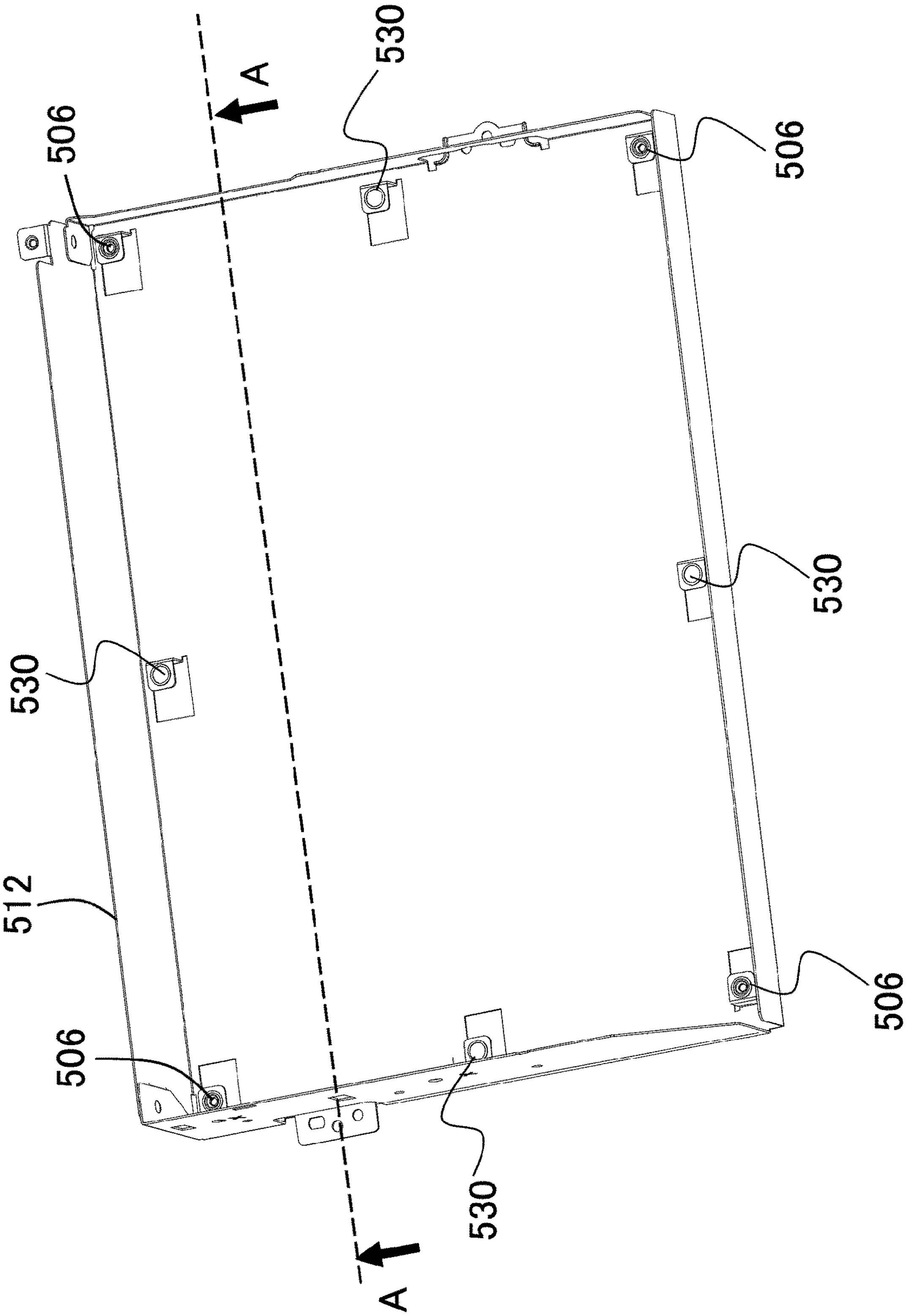

FIG. 24 is a schematic drawing showing a box sheet metal according to the fourth embodiment.

Figure 25:
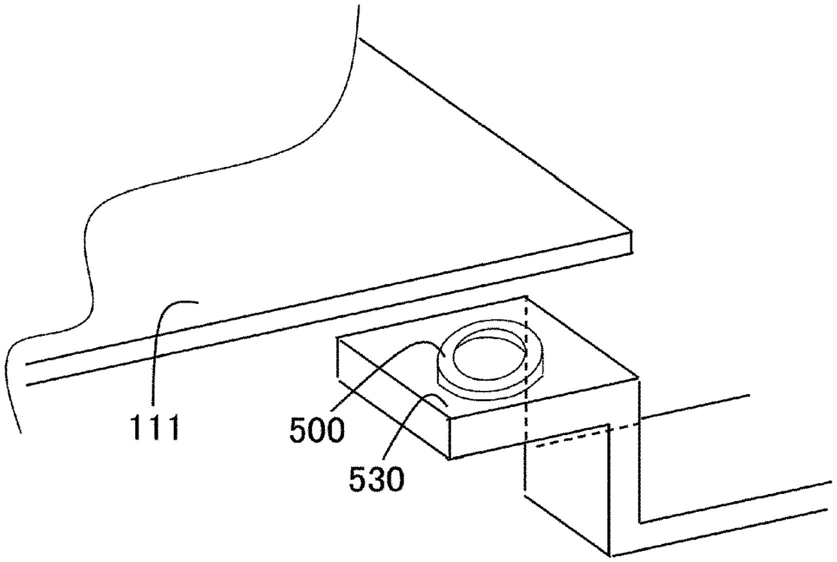
Figure 25:
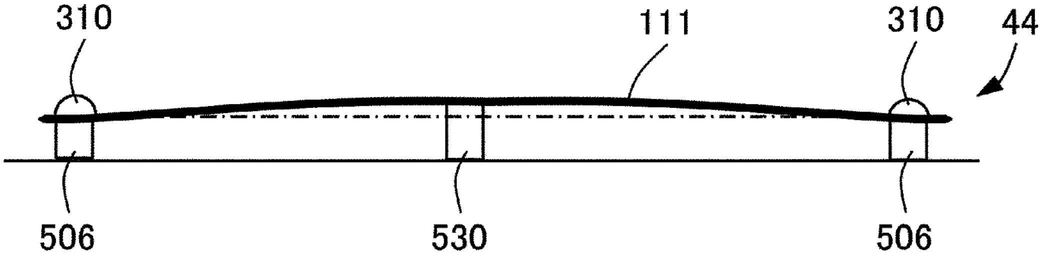
Figure 25:
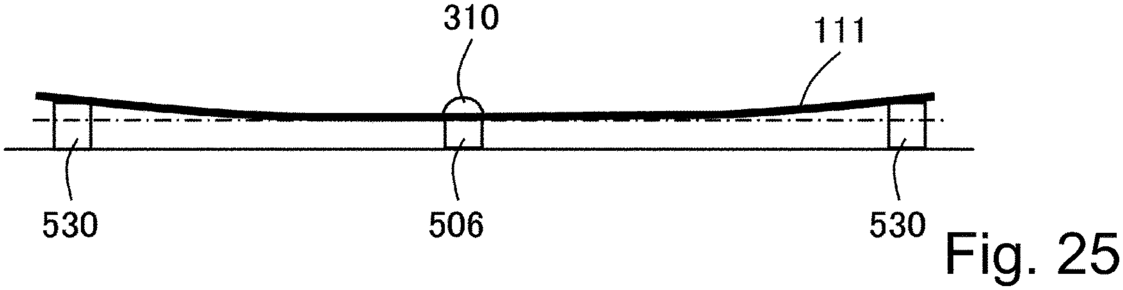

FIG. 25 is a coupling structure between a box sheet metal and a control substrate according to the fourth embodiment, with part (a) of FIG. 25 is a schematic drawing of said coupling structure. Part (b) of FIG. 25 is a cross-sectional drawing when a contact portion is positioned between the screw-fastening portions, and part (c) of FIG. 25 is a cross-sectional drawing when a screw-fastening portion is positioned between the screw-fastening portions.

Figure 26:
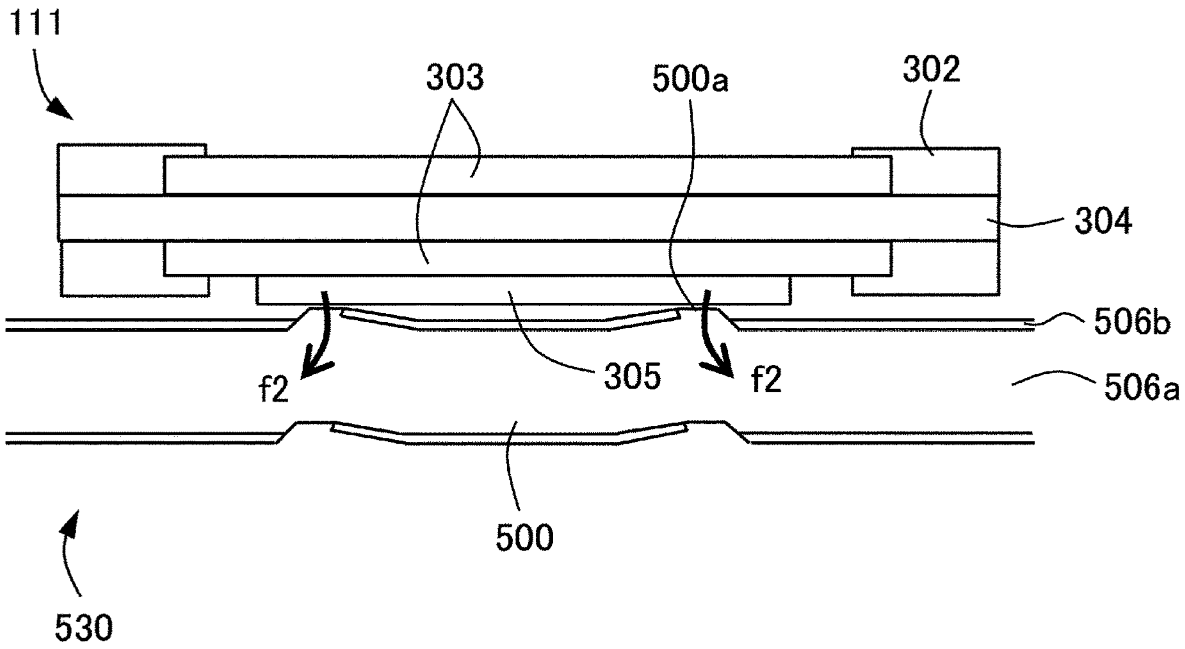

FIG. 26 is a cross-sectional drawing showing a coupling structure between a box sheet metal and a control substrate according to the fourth embodiment.

Figure 27:
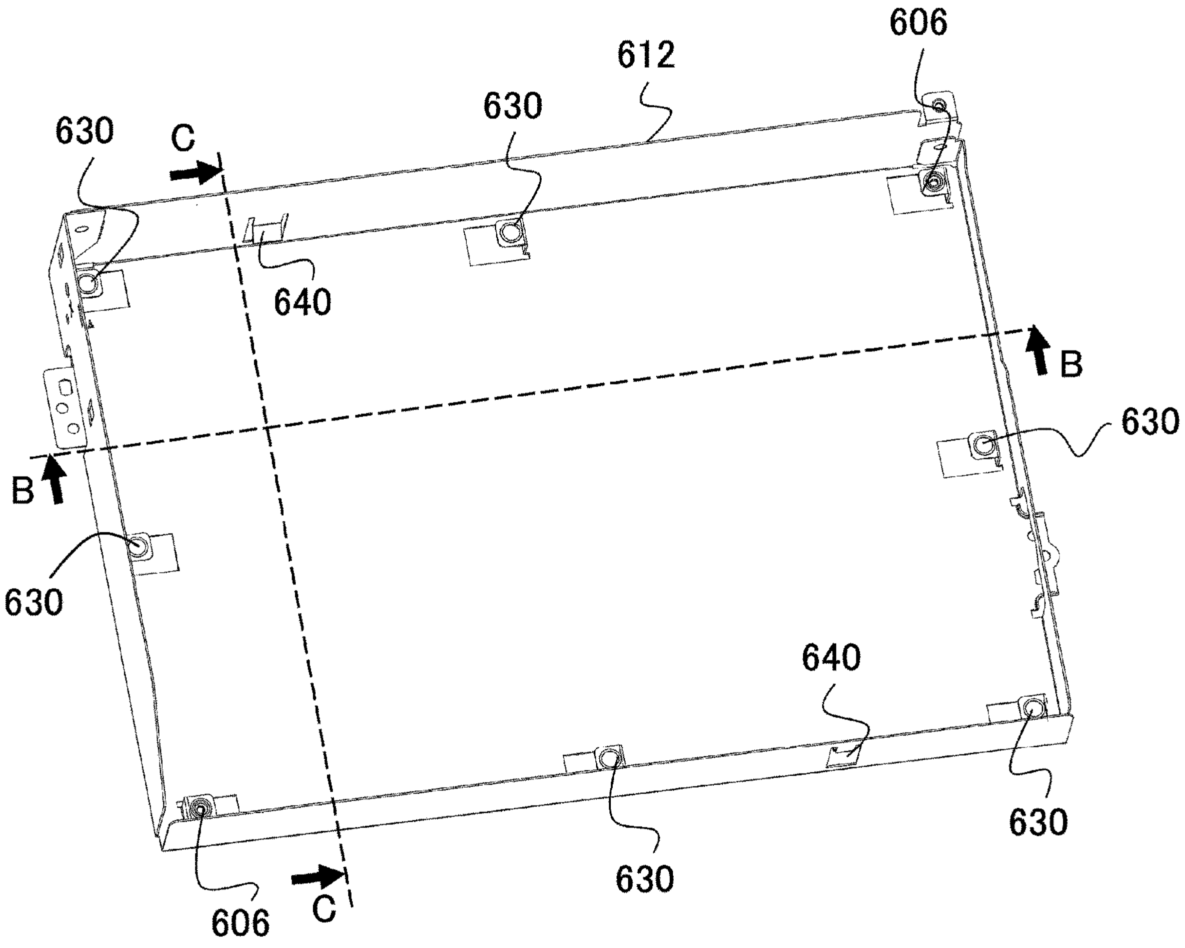

FIG. 27 is a schematic drawing showing a box sheet metal according to the fifth embodiment.

Figure 28:
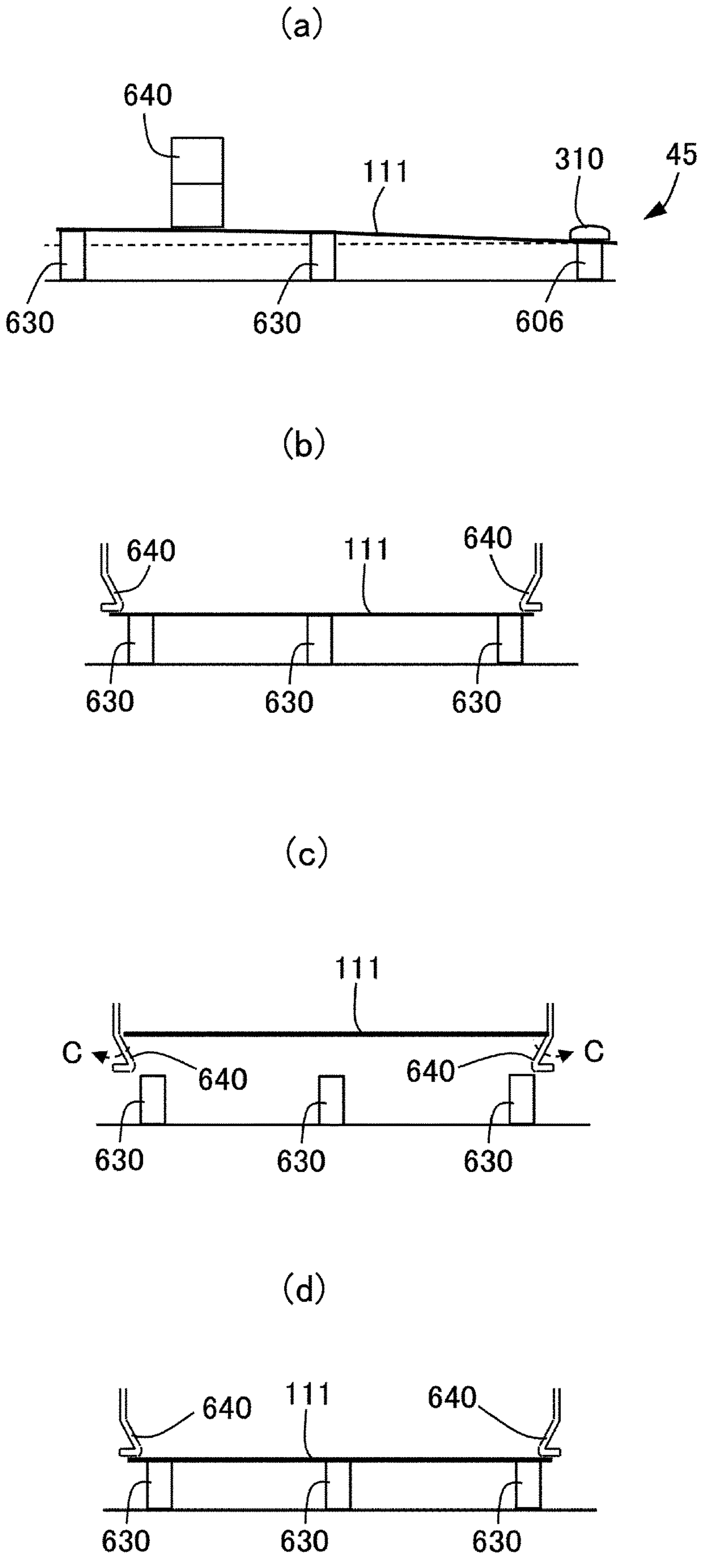

FIG. 28 is a cross-sectional drawing showing a coupling structure between a box sheet metal and a control substrate according to the fifth embodiment, with part (a) of FIG. 28 showing the control portion positioned between the contact portions, part (b) of FIG. 28 showing the control portion holding the two ends of the control substrate, part (c) of FIG. 28 showing the control substrate in the process of being attached, and part (d) of FIG. 28 showing the control substrate after it has been attached.

Figure 29:
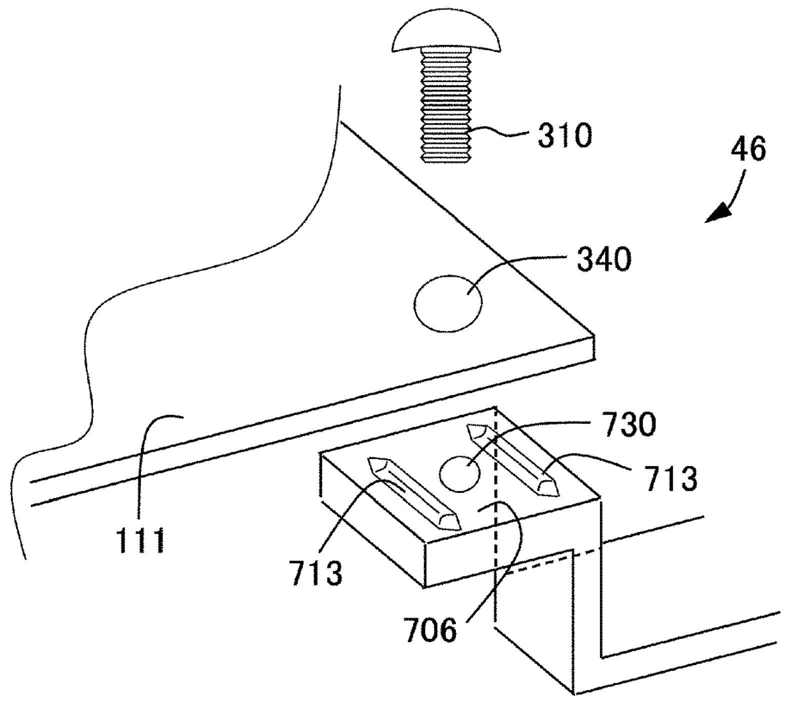
Figure 29:
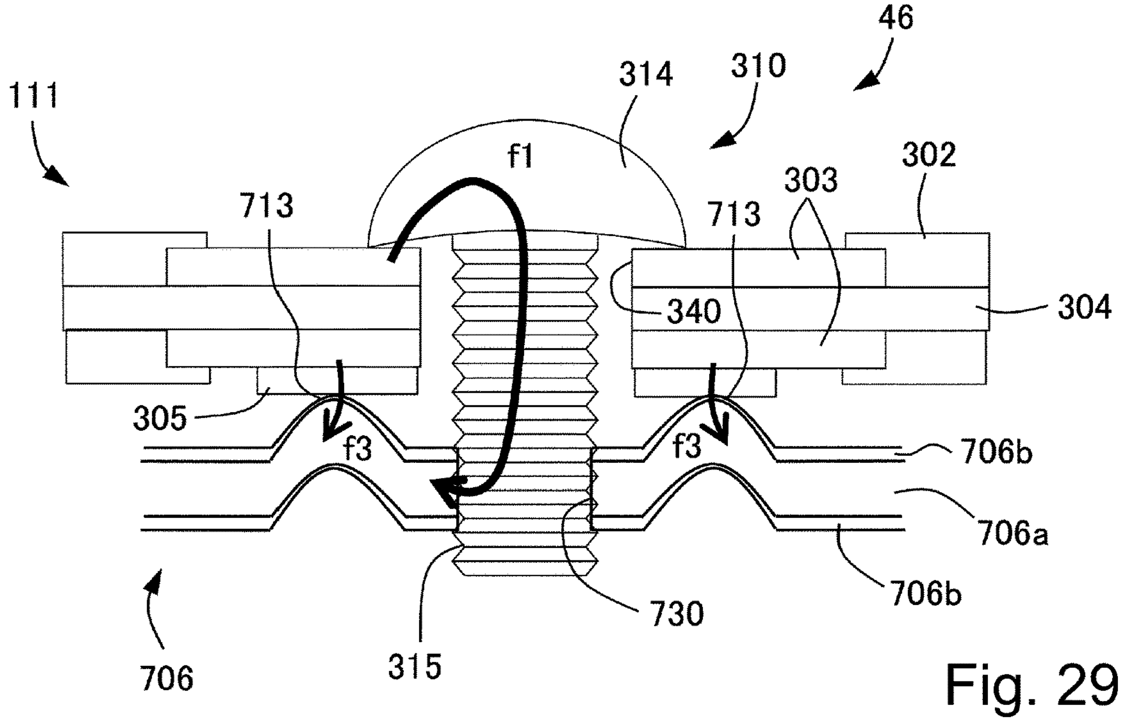

Part (a) of FIG. 29 is a schematic drawing showing a coupling structure between a box sheet metal and a control substrate according to the sixth embodiment, and part (b) of FIG. 29 is a cross-sectional drawing showing a coupling structure between a box sheet metal and a control substrate according to the sixth embodiment.

Figure 30:
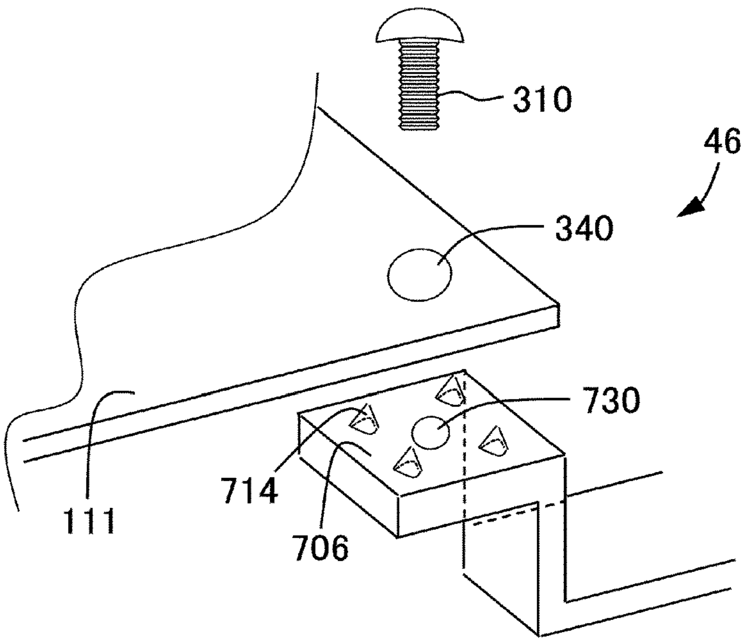
Figure 30:
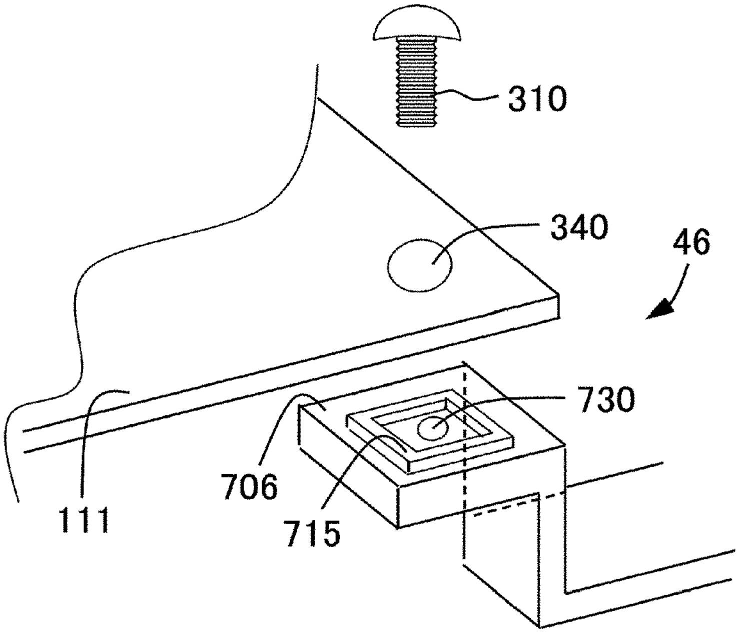

Part (a) of FIG. 30 is a schematic drawing showing a variant of a coupling structure between a box sheet metal and a control substrate according to the sixth embodiment, and part (b) of FIG. 30 is a schematic drawing showing another variant of said coupling structure.

DESCRIPTION OF THE EMBODIMENTS

First Embodiment

Figure 1:
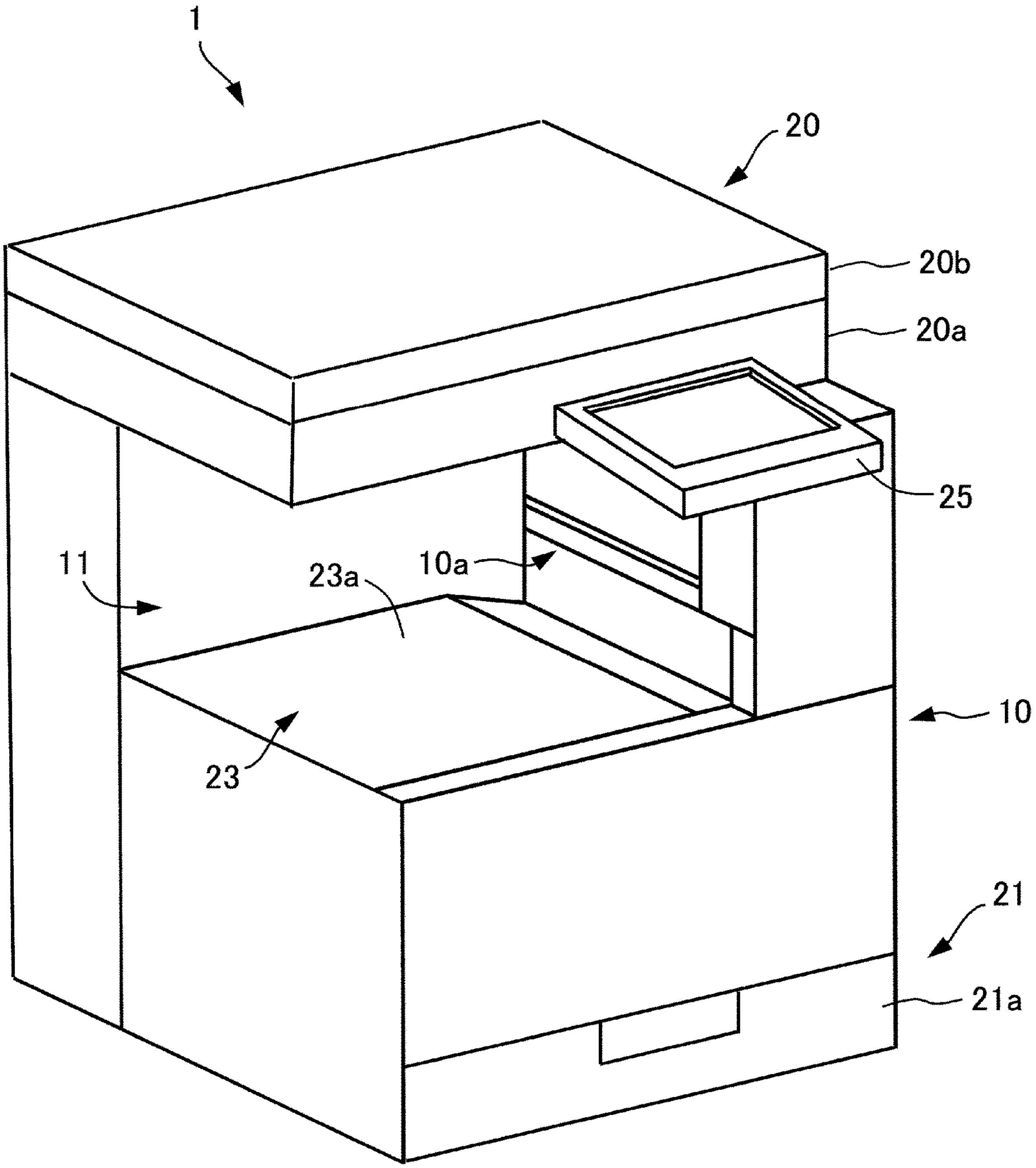
FIG. 1 is a schematic drawing showing a schematic configuration of an image forming apparatus according to the first embodiment.

The following is a detailed explanation of the first embodiment of the present invention, with reference to FIG. 1 through part (b) of FIG. 13. The present embodiment describes a tandem full-color printer as an example of an image forming apparatus 1. However, the present invention is not limited to the tandem type image forming apparatus 1, but may be any other type of image forming apparatus, and is not limited to being full color, but may be monochrome or mono-color, or an inkjet printer. In the following explanation, the vertical and horizontal directions and the positional relationship between the front surface side (front side) and the rear surface side (rear side) shall be represented with respect to the front view of the image forming apparatus 1 (viewpoint in FIG. 2). The side of the image forming apparatus 1 where an operating portion 25 is provided is the front surface side (front side), and the opposite side to the front surface side is the rear surface side.

[Image Forming Apparatus]

As shown in FIG. 1, the image forming apparatus 1 of the present embodiment includes a main assembly 10 (the main body of the image forming apparatus). The main assembly 10 has an image reading portion 20, a feeding portion 21, an image forming portion 6 (see FIG. 2), an ejection portion 23, a control portion 24 (see FIG. 2), and an operating portion 25. The image forming apparatus 1 forms an image on a recording material S based on an image information. The recording material S is a sheet on which the toner image is formed. Examples can include plain paper, a resin sheet that is a substitute for plain paper, thick paper, and a sheet for an overhead projector.

The image reading portion 20 is, for example, a flatbed scanner device and is located in the upper part of the main assembly 10. The image reading portion 20 has a reading main assembly 20*a* equipped with a platen glass and a platen cover 20*b* that can be opened and closed to the reading main assembly 20*a*. A source document placed on the platen glass is scanned by the scanning optics built into the reading main assembly 20*a*, and image information is extracted from the document. A feeding portion 21 is located at the bottom of the main assembly 10 and is equipped with a feeding cassette 21*a* that stacks and stores recording material S, and feeds the recording material S to an image forming portion 6 (see FIG. 2). The ejection portion 23 has an ejection tray 23*a* located downstream of an ejection opening 10*a* formed in the main assembly 10 for recording material S. The ejection portion 23*a* is a face-down tray. The ejection tray 23*a* is a face-down tray and stacks recording material S ejected from the ejection opening 10*a*. The space between the image reading portion 20 and the ejection portion 23*a* constitutes an inner body space 11.

Figure 2:
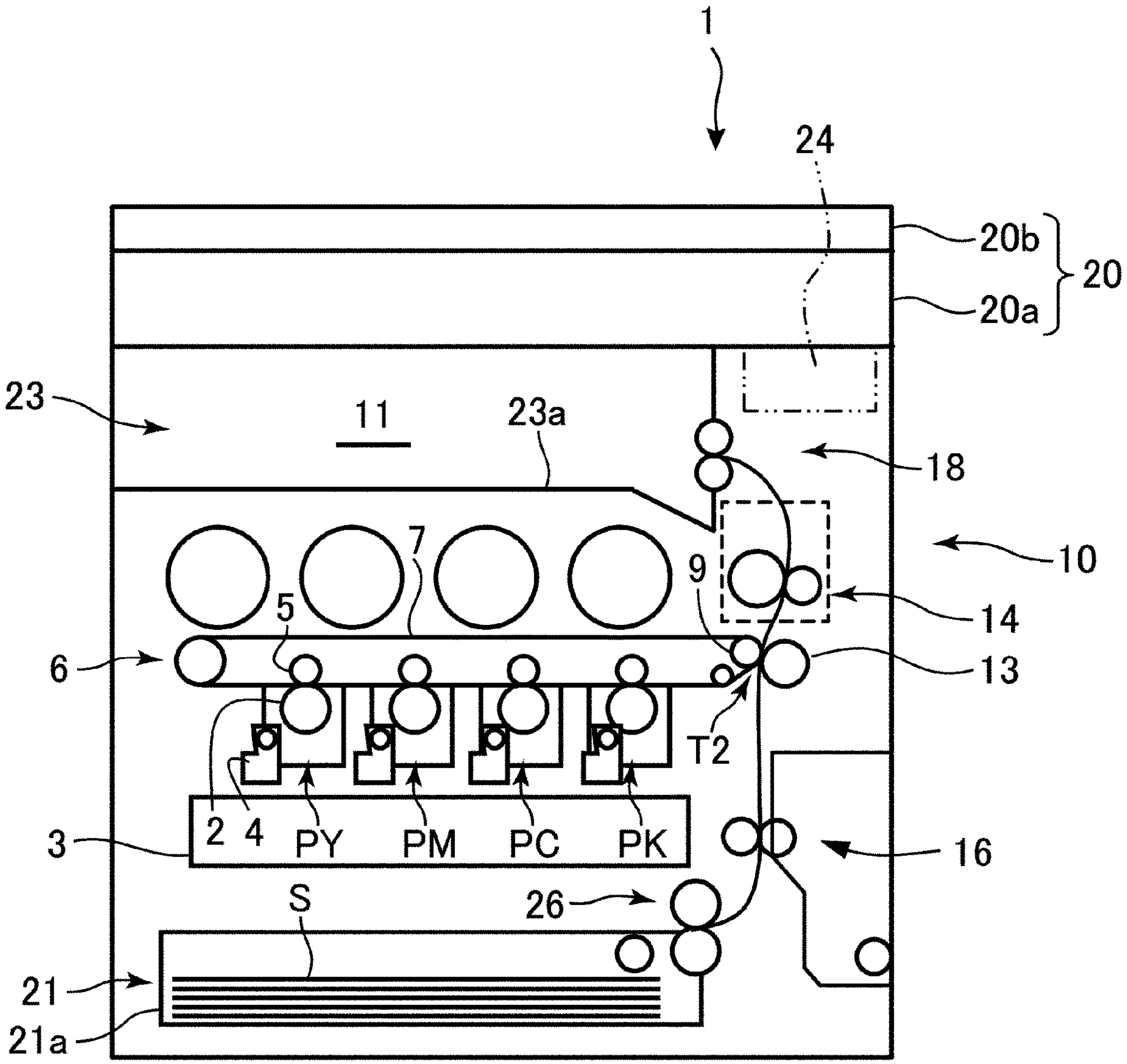
FIG. 2 is a cross-sectional drawing showing a schematic configuration of an image forming apparatus according to the first embodiment.

As shown in FIG. 2, the main assembly 10 incorporates an image forming portion 6, and the image is formed by the image forming portion 6 on the recording material S fed from the feeding cassette 21*a*. The image forming portion 6 forms images based on image information received from the image reading portion 20 or an external device (not shown), e.g. a portable terminal such as a smartphone or a personal computer. In the present embodiment, the image forming portion 6 is a so-called tandem-type intermediate transfer configuration with four image forming units PY, PM, PC, and PK. The image forming units PY, PM, PC, and PK form yellow (Y), magenta (M), cyan (C), and black (K) toner images, respectively, and form images on the recording material S via an intermediate transfer belt 7.

Since each of the image forming units PY, PM, PC, and PK has a similar configuration except for the colors, the image forming unit PY will be described using codes as a representative. In the image forming unit PY, a photosensitive drum 2 made of an organic photoconductor (OPC) or other photosensitive material is surrounded by a charger (e.g., charging roller), a developing unit 4, and a cleaner (not shown). In an image forming operation, a latent image is first formed on each photosensitive drum 2 of the image forming units PY, PM, PC, and PK. As a preparation operation, a high voltage is applied to the charger that is pressed against the photosensitive drum 2 to uniformly charge its surface as the photosensitive drum 2 rotates. Next, a high voltage is applied to a developing sleeve of a developing unit 4 in a different path from that of the charger to uniformly coat the surface of the developing sleeve with the charged toner inside the developing unit 4. Laser scanning of an exposure device 3 forms a latent image by a potential change on the surface of the photosensitive drum 2, and the toner in the developing sleeve develops the latent image on the photosensitive drum 2 as a toner image. The toner image developed on the photosensitive drum 2 is primarily transferred to an intermediate transfer belt 7 by applying a primary transfer voltage to a primary transfer roller 5 facing the photosensitive drum 2 with an intermediate transfer belt 7 in between.

The intermediate transfer belt 7 is rotationally driven along the feeding direction (upward in the figure) of the recording material S in a secondary transfer portion T2. On the surface of the intermediate transfer belt 7, a full-color toner image is formed by multiple transfers of single-color toner images formed by the respective image forming units PY, PM, PC, and PK. The toner image formed on the surface of the intermediate transfer belt 7 is secondarily transferred to the recording material S in the secondary transfer portion T2 formed between a secondary transfer roller 13 and an opposing roller 9. At that time, a secondary transfer voltage is applied to the secondary transfer roller 13.

The recording material S is supplied to the image forming portion 6 in accordance with the image forming process. Here, a feeding roller 26 provided at the bottom of the main assembly 10 separates and feeds the recording material S stored in the feeding cassette 21*a* one sheet at a time. On the right side of the interior of the main assembly 10, a feed path is provided to feed the recording material S from bottom to top along the right side of the main assembly 10. The feed roller 26, feed roller pair 16, secondary transfer roller 13, fixing unit 14, and ejection roller pair 18 are located in this feed path, in order from the bottom. The feeding material S fed by the feeding roller 26 is corrected for skew by the feed roller pair 16 and fed to a secondary transfer portion T2 in accordance with the transfer timing of the toner image. The recording material S on which the unfixed toner image is formed in the secondary transfer portion T2 is fed to the fixing unit 14 having a roller pair and a heating source, etc., to which heat and pressure are applied. As a result, the toner is melted and adhered to the recording material S, and the toner image is fixed to the recording material S. The recording material S with the toner image thus fixed is ejected by the ejection roller pair 18 to an ejection tray 23*a* provided in the upper part of the image forming portion 6.

[Controller Unit]

Figure 3:
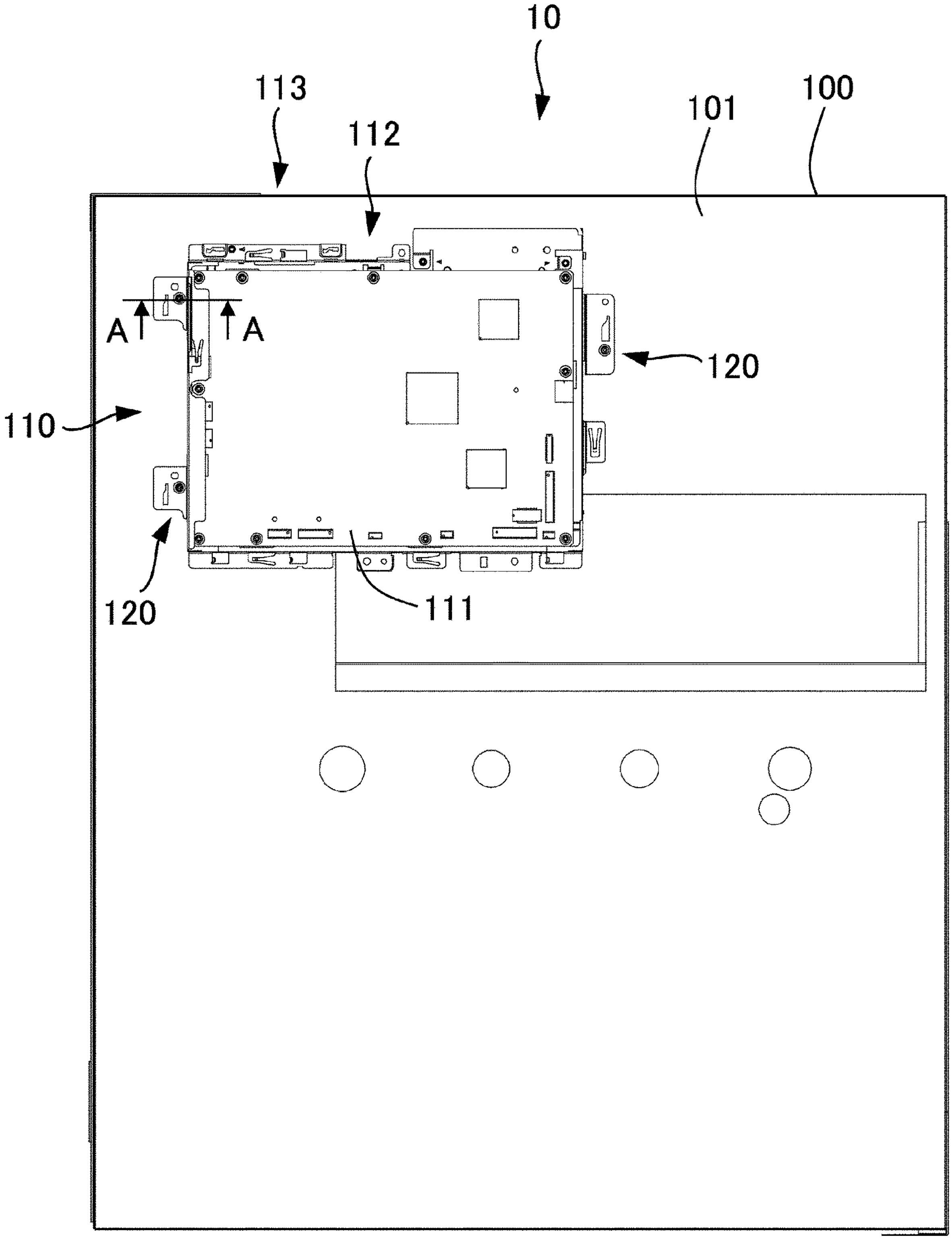
FIG. 3 is a rear view of an installation of a box sheet metal and a rear side plate according to the first embodiment.
Figure 4:
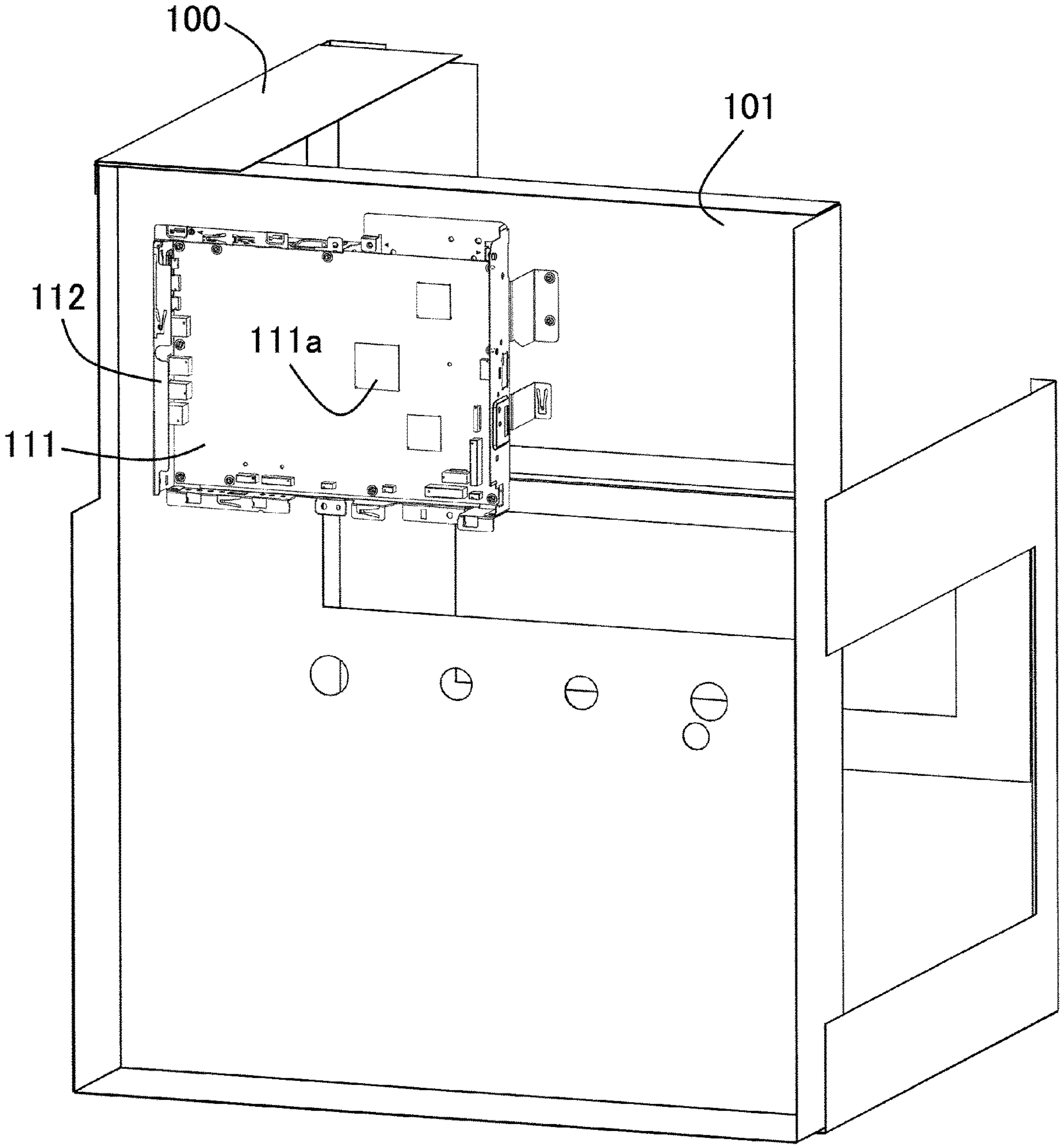
FIG. 4 is a schematic drawing showing an installation of a box sheet metal and a rear side plate according to the first embodiment.
Figure 5:
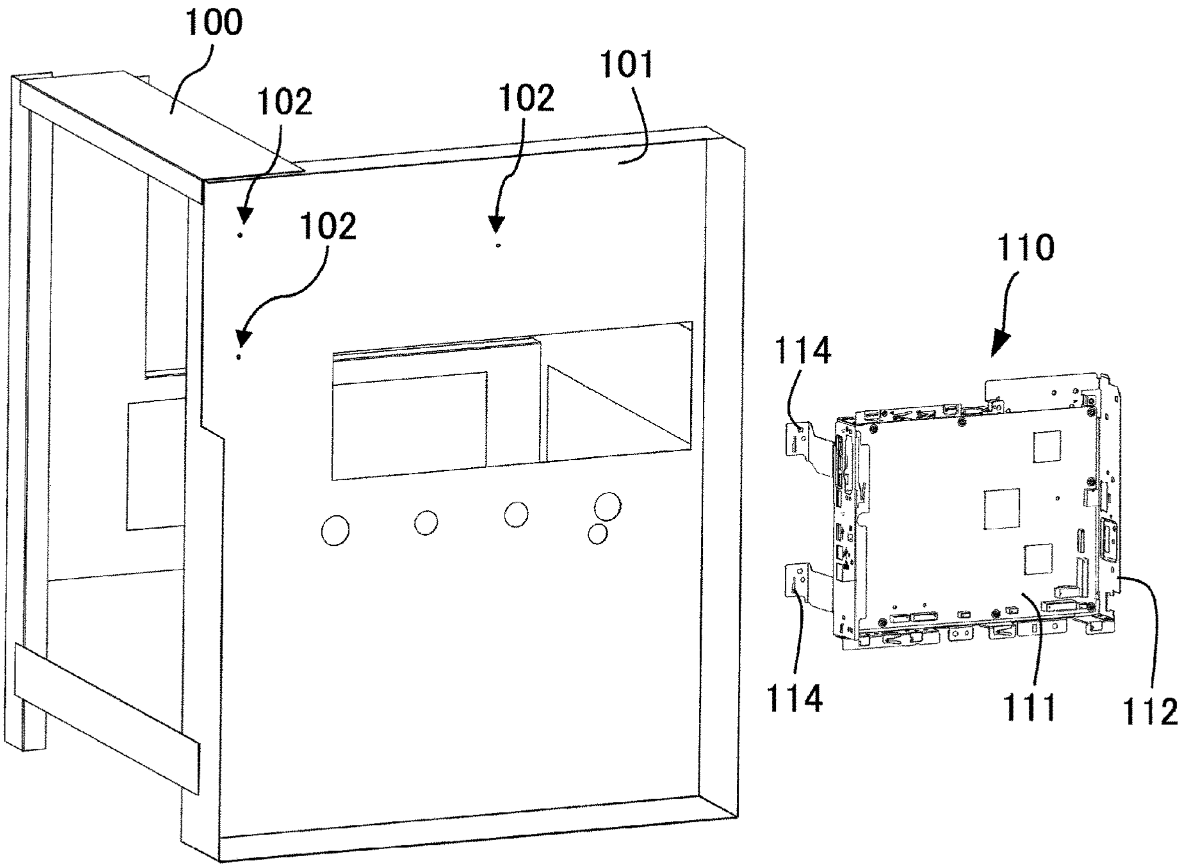
FIG. 5 is a schematic drawing showing a box sheet metal and a rear side plate according to the first embodiment, prior to installation.

A controller unit 110, which constitutes a control portion 24, is described using FIGS. 3 through 5. A controller unit 110 has a control substrate 111 that controls the image forming apparatus 1 and an electric component box 113 that houses a control substrate 111. The electric component box 113 has a box sheet metal 112, which is an example of a casing, and a top plate (not shown), which is an example of a lid. The electric component box 113 is attached to a frame 100 of the main assembly 10.

FIG. 3 is a schematic drawing of the main components of the frame 100 and controller unit 110, viewed from the rear side of the image forming apparatus 1. The control substrate 111 generates signals for creating an electrostatic latent image based on image information read by the image reading portion 20 or input from an external device such as a PC. The rear side plate 101, which is an example of a side plate, is provided at the back of the frame 100 and is one configuration example of the frame 100, and the box sheet metal 112 is held by being fastened to the rear side plate 101 by screws.

FIG. 4 is a schematic drawing of the frame 100 of the image forming apparatus 1, viewed from the rear side. FIG. 5 is a schematic drawing of the frame 100 of the image forming apparatus 1, viewed from the rear side, showing the state before the box sheet metal 112 is attached to the frame 100. As shown in FIG. 4, the image forming apparatus is equipped with control substrate 111 on the rear side plate 101 of the frame 100. The control substrate 111 is mounted on a box sheet metal 112 that can support it. As shown in FIG. 5, the box sheet metal 112 is assembled to the rear side plate 101 of the frame 100 in a unitized state with the control substrate 111. The rear side plate 101 has tapped holes 102 for fastening screws 120. The box sheet metal 112 holding the control substrate 111 is coupled to the rear side plate 101 by inserting the screws 120 through the screw holes 114 and tightening them into the tapped holes 102.

As shown in FIG. 4, etc., the box sheet metal 112 in the present embodiment has a bottom portion with a surface to which the control substrate 111 is fixed (a surface whose thickness direction is parallel to that of the rear side plate 101), and four wall portions that are bent against the bottom portion. The box sheet metal 112 in the present embodiment, together with the top panel, forms an accommodating space for the control substrate 111. The accommodating space is not a completely sealed space, but may have openings or notches in the bottom and four wall portions for inserting connecting wires that connect other plates to the control substrate 111.

The frame 100 is equipped with a power cord connection and a power cord, and the power cord connection can electrically connect the ground wire of the power cord to the frame 100. The rear side plate 101 and the box sheet metal 112 are each composed of a steel plate with at least one surface covered with an insulating film.

The control substrates 111 are image forming control substrates that control the image forming components. Each control substrate 111 has an image forming control circuit 111*a* mounted on it. To ground the control substrate 111, first the control substrate 111 is electrically connected to the box sheet metal 112, then the box sheet metal 112 is attached to the frame 100, and finally the frame 100 is connected to the power cord via the power cord connection and grounded. In the present embodiment, electrogalvanized steel sheet 30 is used as the steel sheet that makes up the rear side plate 101 and box sheet metal 112 (see FIG. 6).

Figure 6:
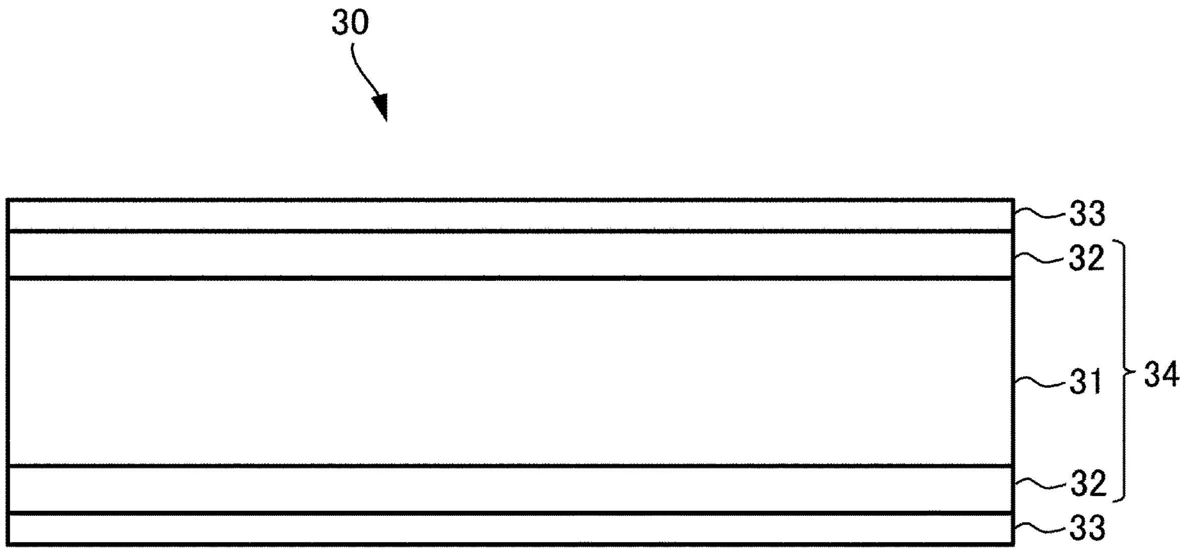
FIG. 6 is a cross-sectional drawing of the electrogalvanized steel sheet used in the first embodiment.

The electrogalvanized steel sheet used for the rear side plate 101 and box sheet metal 112 is explained here using FIG. 6. FIG. 6 is a cross-sectional drawing of a typical electrogalvanized steel sheet 30. Electrogalvanized steel sheet 30 has a base metal 31 and a galvanized layer 32, which are examples of a metal layer made of metal, and a resin layer 33, which is an example of an insulative layer. The base metal 31 is the steel sheet steel itself, and the galvanized layer 32 is a zinc plated layer on the surface of the base metal 31. The galvanized layer 32 is composed to prevent corrosion of the base metal 31. Since the base metal 31 and the galvanized layer 32 are each metals, they are conductive, and these are referred to as a metallic portion 34 as an example of a metal layer. The resin layer 33 is a layer (approximately 1-4 μm) added to the surface of the galvanized layer 32 to add further value (stain resistance, lubricity, fingerprint resistance), and because it is a resin layer, it is an insulative layer without conductivity. The typical thickness of the electrogalvanized steel sheet 30 is about 0.4 to 3.2 mm.

Electrogalvanized steel sheet with an insulative layer on the surface is called a sheet metal. A similarly structured steel sheet is a colored steel sheet. In a colored steel sheet, the resin layer 33 is a coating film made of paint. Since this coating film is not conductive, the present invention can be applied. The sheet metal is cut at the edge to form the shape of the part to be processed. The cut surface of the sheet metal is conductive because a metal matrix 31 and a galvanized layer 32 are exposed.

[Coupling Structure of a Conventional Rear Side Plate and Electric Component Box]

A conventional method of making sheet metals that have no conductivity on their surfaces conductive to each other is explained here using parts (a) and (b) of FIG. 7. Part (a) of FIG. 7 shows a cross-sectional drawing of a threaded portion of a conventional example of the box sheet metal 112 fastened to the rear side plate 101 (cross-sectional drawing cut along the A-A line in FIG. 3), showing good conductivity, and part (b) of FIG. 7 shows a cross-sectional drawing of a threaded portion of the box sheet metal 112 fastened to the rear side plate 101, showing poor conductivity. Because the box sheet metal 112 and the rear side plate 101 are composed of sheet metal, there are non-conductive areas on the surface layer that are insulative layers. The conductive parts of the box sheet metal 112 and the rear side plate 101 are conductive parts 112*a* and 101*a*, respectively (corresponding to the metal portion 34 in FIG. 6), and the non-conductive parts are non-conductive portions 112*b* and 101*b*, respectively (corresponding to the resin layer 33 in FIG. 6). Therefore, even if the surface contact between the box sheet metal 112 and the rear side plate 101 is made, the box sheet metal 112 and the rear side plate 101 do not conduct by themselves because there are non-conductive portions 112*b* and 101*b* between the box sheet metal 112 and the rear side plate 101.

In the case of good conductivity shown in part (a) of FIG. 7, when fastening with a screw 120, the screw sheet surface 121, which is the contact area of the screw head with the box sheet metal 112, slides against the non-conductive portion 112*b* of the box sheet metal 112 due to rotation and torque of the screw 120 during screw tightening. This causes the screw sheet surface 121 to scrape the non-conductive portion 112*b* and come into contact with the exposed conductive portion 112*a*. The screw 120 itself is conductive because it is made of carbon steel with a zinc plated surface. Therefore, the screw 120 and the box sheet metal 112 are conductive. The threaded portion 122 of the screw 120 also screws into and contacts the tap hole 102 in the rear side plate 101. Since the tap hole is also provided in the conductive portion 101*a*, the screw 120 and the rear side plate 101 are conductive. From the above, the box sheet metal 112 and the rear side plate 101 are in conductivity through the screw 120.

Next, in the case of poor conductivity shown in Part (b) of FIG. 7, if the torque used to tighten the screw 120 is weak, the non-conductive portion 112*b* is not sufficiently shaved off, and the non-conductive portion 112*b* remains. In this case, the screw sheet surface 121 and the conductive portion 112*a* will not be able to make contact, so conduction between the box sheet metal 112 and the rear side plate 101 via the screw 120 will not be possible, or conduction will be unstable. The reason for instability is that the insulative layer is a thin layer of only a few microns, so there is some erosion of the layers when they are in contact with each other, which can lead to a state of conduction. However, this may not result in conductivity, or even if conductivity is achieved, the resistance may be high, and the intended electrically stable connection may not be achieved, resulting in poor conductivity.

Thus, assuming stable grounding of the sheet metal, a structure in which the electronic circuit board is shielded by the sheet metal can reduce EMI due to radiated noise from the inside and suppress ESD from the outside. In contrast, it does not mean that electrical continuity is achieved if conductive parts such as sheet metal and electronic circuit boards are in contact with each other. An unstable connection results in a high impedance and resistance, and is not a stable grounding.

In addition, due to the recent increase in frequency speed, EMI factors in electronic circuit boards may extend to high frequencies exceeding 1 GHz. The higher the frequency, the shorter the wavelength, so even a short gap (slit) in sheet metal can be a factor that amplifies EMI. Theoretically, resonance occurs when the wavelength $\lambda/2$ of the radiated noise matches the length of the slit. For example, if we consider a frequency of 6 GHz, 2.5 cm is the slit length that resonates. In order to reduce the slits that contribute to radiated noise resonance at high frequencies, grounding must be achieved by stable coupling of conductive metal parts (e.g., sheet metal to sheet metal, or electronic circuit board to sheet metal) at ever-tighter intervals. On the other hand, in order to achieve stable grounding even when romp-free steel plates are used, there is a technique for grounding by sliding the leading edge of one sheet metal when coupling two sheet metals by a screw member, thereby scraping off the resin coating layer of the other sheet metal and exposing the metal inside. This exposes the metal inside the other sheet metal, which is then grounded to the ground. However, processing is performed to expose the metal portion from the resin coat layer of a sheet metal, but in order to achieve stable coupling, a conductive member must be clamped in between and tightened with a fastening member such as a screw member or bolt and nut. Therefore, when attempting to make connections at narrow intervals, many conductive members and screw member connection structures are required. When assembling devices using such parts, the number of parts and assembly man-hours increases, resulting in higher costs.

[Coupling Structure of a Rear Side Plate and Electric Component Box According to the Present Embodiment]

A coupling structure 41 of the present embodiment is explained in detail below. FIG. 8 shows a controller unit 210 with a box sheet metal 212, which is an example of a second member of the present embodiment with measures to prevent poor conductivity, attached to a rear side plate 101, which is an example of a first member. Since one of the first and second members is the rear side plate 101 and the other of the first and second members is the box sheet metal 212 that is part of the electric component box 113 the first member and the second member may be the opposite of the setting in the present embodiment.

The rear side plate 101 and box sheet metal 212 are components made of the above-mentioned electrogalvanized steel sheet, which is made of sheet metal with a resin layer 33 which is an example of an insulative layer on the surface of a metal layer. Around a screw hole 213, which is an example of a through hole of the box sheet metal 212, a second conductive portion 34 is exposed by removing the resin layer 33, which is an insulative layer, by press working. The convex-shaped projections 215*a* and 215*b*, which are examples of portions, are provided around the through hole 213. The details of said press working and projections 215*a*, 215*b* are explained later. Similarly, on the surface of the rear side plate 101 that is in contact with the box sheet metal 212, the resin layer 33, which is the insulative layer, is removed and the conductive metal portion 34 is exposed, which is an example of a first conductive portion, projections 105*a* and 105*b* (see part (a) of FIG. 14). This results in the coupling structure 41 in which the conductive portions of projections 215*a* and 215*b* on the box sheet metal 212 and the conductive portions of projections 105*a* and 105*b* on the rear side plate 101 (see part (a) of FIG. 14). That is, coupling structure 41 couples the rear side plate 101 to the box sheet metal 212.

Next, part (a) of FIG. 9 through part (b) of FIG. 11 are used to explain the processing method and shape of the projections.

As shown in part (a) of FIG. 9, press working (half blanking work) is applied to the electrogalvanized steel sheet 30 using a punch 51 and die 61 as a first process to form a half blanking convex projection of about ⅓ to ⅔ the thickness of an electrogalvanized steel sheet 300. By press working, as shown in part (b) of FIG. 9, the resin layer 33 on the surface of a side surface 35*a* of the projection 35 is removed, exposing a conductive metal portion 34. The shape of the half blanking can be circular, oval, rectangular, or any other shape that can be formed with a punch and die.

In a second process, as shown in part (a) of FIG. 10, press working is performed on the projection 35 processed in the first process from the opposite direction using a punch 52 and a die 62. This process collapses the side surface 35*a* of the projection 35, as shown in part (b) of FIG. 8. As a third process, as shown in part (a) of FIG. 11, the projection 35 processed in the second process is further press worked with a punch 53 and a die 63. As shown in part (b) of FIG. 11, this process forms a part of the side surface 35*a* of the projection 35, which forms the top surface portion of the projection 35 that contacts during coupling, and the conductive metal portion 34 becomes the contact surface.

FIG. 12 shows projections 215*a* and 215*b* (corresponding to projection 35 in part (b) of FIG. 11) provided on the box sheet metal 212. The box sheet metal 212 has a coupling surface 214 coupling with the rear side plate 101, a screw hole 213 formed on the coupling surface 214, and two projections 215*a*, 215*b* provided near the screw hole 213. Each projection 215*a*, 215*b* has an abbreviated rectangular shape and is arranged so that the longitudinal direction is straight across the screw hole 213. The portion where projections 215*a*, 215*b* contact the rear side plate 101 is exposed to the conductive metal portion 34, which stabilizes conduction.

The coupling structure 41 of the box sheet metal 212 and the rear side plate 101 is explained using parts (a) and (b) of FIG. 13. Part (a) of FIG. 13 shows the box sheet metal 212 before it is coupled to the rear side plate 101. The box sheet metal 212 has two projections 215*a* and 215*b* near the screw holes 213 on the coupling surface 214 where the box sheet metal 212 couples to the rear side plate 101. The portion of the projections 215*a* and 215*b* in contact with the rear side plate 101 is conductive. On the other hand, two projections 105*a* and 105*b* are also provided near the screw holes 103 on the opposite rear side plate 101, and the portions where the projections 105*a* and 105*b* contact the box sheet metal 212 are conductive. The box sheet metal 212 moves in a D1 direction and is coupled to the rear side plate 101 by a screw 220 (screw member), which is an example of a coupling portion. That is, the screw 220 couples the rear side plate 101 and the box sheet metal 212 with the projections 105*a*, 105*b* and the projections 215*a*, 215*b* in contact with each other at least partially.

Part (b) of FIG. 13 shows the box sheet metal 212 and the rear side plate 101 coupled by the screws 220. A part of projection 215*a* of the box sheet metal 212 contacts a part of projection 105*a* of the rear side plate 101, and similarly, a part of projection 215*b* of the box sheet metal 212 contacts a part of projection 105*b* of the rear side plate 101. Since the contacting parts are conductive, the conduction is stable.

As mentioned above, according to coupling structure 41 of the present embodiment, when coupling sheet metal that has an insulating film and a metal portion, such as chrome-free steel sheet and colored steel sheet, a process is applied to ensure that the metal portion is exposed from the insulating film, and a structure is taken in which the exposed surfaces are in contact. This allows for electrically stable grounding and reduces the number of conductive members and screw member connection structures, effectively enhancing EMI reduction and ESD resistance. Therefore, electrically stable grounding can be achieved in the coupling structure 41 between sheet metals used in the image forming apparatus 1.

In addition, since many conductive members and screw member connection structures are not required, the increase in the number of parts and assembly man-hours can be suppressed.

The Second Embodiment

Next, the second embodiment of the present invention is explained in detail with reference to FIG. 14 to part (b) of FIG. 17. The present embodiment differs from the first embodiment in that the resin layer 33 of sheet metal is made conductive by stretching it thin. That is, by providing a bead portion, which is a ribbed projection shape on the electrogalvanized steel sheet, the insulative layer at the leading edge of the bead portion is stretched thin to make the leading edge conductive and contact is made at the leading end to stabilize the conductive portion. However, the other components are the same as in the first embodiment, so the same symbols are used and a detailed description is omitted.

FIG. 14 shows a controller unit 210 with a box sheet metal 212 with poor conductivity prevention measures in the present embodiment, mounted to a rear side plate 101. The rear side plate 101 and the box sheet metal 212 are components made of electrogalvanized steel sheets, the surfaces of which are covered with a resin layer 33. Around a screw hole 213 in the box sheet metal 212, bead portions 216*a* and 216*b* are formed by press working to form a bead shape, and the resin layer 33, which is the insulative layer at the leading end of the bead portion, is stretched thin so that the leading end of the bead portion is conductive. Details of the bead portions 216*a* and 216*b*, which are examples of this press working and a second conductive portion, are described below. Similarly, the resin layer, which is the insulative layer, is stretched on the surface of the rear side plate 101 that is in contact with the box sheet metal 212, and bead portions 106*a* and 106*b* (see part (a) of FIG. 17) in the shape of beads, which are examples of the first conductive portions with leading ends, are provided. This results in a coupling structure 42 in which the conductive portions of bead portions 216*a* and 216*b* on the box sheet metal 212 and the conductive portions of bead portions 106*a* and 106*b* on the rear side plate 101 are in contact. That is, the coupling structure 42 couples the rear side plate 101 to the box sheet metal 212.

Next, parts (a) and (b) of FIG. 15 are used to explain the processing method and shape of the bead portion.

As shown in part (a) of FIG. 15, an electrogalvanized steel sheet 30 is press worked with a punch 54 and a die 64 to form a bead portion 36 on the electrogalvanized steel sheet 30. A leading end 36*a* of the bead portion 36 formed by press working is thinned by stretching the resin layer 33 on the surface, which decreases the electrical resistance of the leading end 36*a* and stabilizes the conductive portion by bringing the leading end 36*a* into contact with the counterpart material. The resistance of the resin layer 33 at the leading end 36*a* should be, for example, about 0.04 to 0.004Ω. In this case, the thickness of the resin layer 33 should be, for example, about 0.6 to 1.0 μm. That is, in the box sheet metal 212, the thickness of the resin layer 33 of the leading end 36*a*, which is an example of a second conductive portion, is thinner than the thickness of the resin layer 33 around the leading end 36*a*.

FIG. 16 shows bead portions 216*a*, 216*b* (corresponding to the bead portion 36 in part (b) of FIG. 15) on the box sheet metal 212. The two bead portions 216*a* and 216*b* are provided near the screw hole 213 on the coupling surface 214 where the box sheet metal 212 couples with the rear side plate 101. Each bead portion 216*a*, 216*b* is arranged so that the longitudinal direction is straight across the screw hole 213. The electrical resistance of the leading end of each bead portion 216*a*, 216*b* (corresponding to the leading end 36*a* in part (b) of FIG. 15) is low, so the conductive portion in contact with the rear side plate 101 is stable.

The coupling structure 42 of the box sheet metal 212 and the rear side plate 101 is explained using parts (a) and (b) of FIG. 17. Part (a) of FIG. 17 shows the box sheet metal 212 before it is coupled to the rear side plate 101. The box sheet metal 212 has two bead portions 216*a*, 216*b* near the screw hole 213 on the coupling surface 214 where it is coupled to the rear side plate 101. The bead portions 216*a*, 216*b* contacting the rear side plate 101 are conductive portions. On the other hand, two bead portions 106*a* and 106*b* are also provided near the screw hole 103 on the opposite rear side plate 101, and the areas where the bead portions 106*a* and 106*b* contact the box sheet metal 212 are conductive portions. The box sheet metal 212 is moved in the D2 direction and coupled to the rear side plate 101 by a screw 220.

Part (b) of FIG. 17 shows the box sheet metal 212 and the rear side plate 101 coupled by the screw 220. The leading end of the bead portion 216*a* of the box sheet metal 212 contacts the leading end of the bead portion 106*a* of the rear side plate 101, and similarly the leading end of the bead portion 216*b* of the box sheet metal 212 contacts the leading end of the bead portion 106*b* of the rear side plate 101. Since each part in contact is conductive, conduction is stable.

As mentioned above, according to the coupling structure 42 of the present embodiment, since the bead portions of the resin layer stretched by press working are brought into contact with each other, each contacting portion is conductive and thus conductive portions are stable. This allows for electrically stable grounding and reduces the number of conductive members and screw member connection structures, effectively enhancing EMI reduction and ESD resistance. Therefore, electrically stable grounding can be realized in the coupling structure 42 between sheet metals used in the image forming apparatus 1. In addition, since many conductive members and screw member connection structures are not required, the increase in the number of parts and the number of assembly man-hours can be suppressed.

The Third Embodiment

Next, the third embodiment of the present invention is explained in detail with reference to FIG. 18 through part (b)

of FIG. 23. The present embodiment differs from the first embodiment in that a coupling structure 43 of sheet metals is applied to the attachment of a control substrate 111, an example of a first member, and a box sheet metal 412, an example of a second member of an electric component box 113. However, the other components are the same as in the first embodiment, so the same codes are used and detailed explanations are omitted.

First, the coupling structure of a conventional control substrate 111 and a box sheet metal 312 is explained using FIG. 18 through part (b) of FIG. 20. FIG. 18 is a rear view of the image forming apparatus 1, showing the rear side of the apparatus with the rear side plate 101, the box sheet metal 312 of the electric component box 113, and the control substrate 111 attached.

The control substrate 111 is coupled to the electric component box 113 at eight locations using screws 310. The electric component box 113 is coupled to the rear side plate 101 at two points using screws 360. FIG. 19 is a schematic drawing of the box sheet metal 312. The box sheet metal 312 is a box-shaped piece of sheet metal that holds and protects the control substrate 111. There are eight flange-shaped screw-fastening portions 306 with screw holes 330 (see part (a) of FIG. 20) to attach the control substrate 111, three on each side, for a total of eight locations.

Part (a) of FIG. 20 is a schematic drawing showing the details of a conventional attachment structure of the control substrate 111 and the screw-fastening portion 306. The control substrate 111 is assembled by providing a hole 340, which is an example of a through hole through which a screw 310 can penetrate, and tightening the screw 310 into the screw hole 330 formed in the screw-fastening portion 306.

Part (b) of FIG. 20 is a cross-sectional drawing of a conventional screw-fastening portion 306 with the control substrate 111 attached by means of a screw 310. Part (b) of FIG. 20 is a cross-sectional drawing of a typical electrogalvanized steel sheet, which is the material of the control substrate 111 and the screw-fastening portion 306. The screw-fastening portion 306 has a conductive metal portion 306*a*, which is made of a sheet metal base material and a zinc plating layer, and a resin layer 306*b*. The control substrate 111 has a core member 304, a copper foil 303 covering the front and back surfaces, and a register 302 on the front and back surfaces. In addition, a lead solder 305 is welded to the underside of the copper foil 303, which is in contact with the screw-fastening portion 306. The solder 305 protrudes beyond the register 302, so that the screw-fastening portion 306 is in contact with the solder 305, not the register 302.

Next, the flow of a current f1 generated by conducting from the control substrate 111 to the screw-fastening portion 306 through the screw 310 is explained. The surface of the base material of the screw 310 is surface treated and a resin coat layer is formed, similar to an electrogalvanized steel sheet. When screwing in the screws 310, the screw heads 314 (heads) are pressed against the control substrate 111 while rotating and sliding against the control substrate 111, so that the resin layer of the screw heads 314 is peeled off and the copper foil 303 is in direct contact with the base metal. The screw thread 315 rotates in the same manner and is pressed against the screw hole 330 while sliding against it, so that the resin layer peels off and the screw thread 315 is in direct contact with the metal portion 306*a* of the screw hole 330. As a result, when an external charge is input to the control substrate 111, it flows from the copper foil 303 to the screw head 314, through the screw 310, through the screw thread 315 to the metal portion 306*a*, and falls to ground as represented by the current f1.

Here, the assembly angle at which the screw 310 enters the screw-fastening portion 306 should be a perpendicular angle, but when a worker assembles it, a variation of around ±10° may occur. Accordingly, there is a variation in the way the resin layer peels off when the screws are fastened. Therefore, when the resin layer is not sufficiently peeled off, resistance may be high and grounding stability may be lacking.

[Coupling Structure of a Box Sheet Metal and a Control Substrate According to the Present Embodiment]

The coupling structure 43 of the present embodiment is explained in detail below. In the present embodiment, a projection 35 is formed in the same way as in the first embodiment, where the resin layer 33 is peeled off to expose a metal portion 34 by press working shown in part (a) of FIG. 9 to part (b) of FIG. 11. Projection 400 of the same configuration is formed on the screw-fastening portion 406 of the box sheet metal 412. That is, as shown in part (a) of FIG. 21, the screw-fastening portion 406 is made of a common electrogalvanized steel sheet, and the press working peels off the resin layer 406*b* to form a projection 400*a* with the side 400*a* exposing the metal portion 406*a*. The projection 400 and the control substrate 111 are then screwed together to provide conductivity.

Part (a) of FIG. 21 is a plan view of the press working process of forming screw hole 430 by punching a hole using a punch 55 in the projection 400 formed in the screw-fastening portion 406. FIG. 22 shows the box sheet metal 412 of the present embodiment, which has eight flanged screw-fastening portions 406, three on each side, to attach the control substrate 111. Each screw-fastening portion 406 has a screw hole 430 and the projection 400, which is an example of a second conductive portion with the metal portion 406*a* exposed around the screw hole 430 (see part (a) of FIG. 23).

Part (a) of FIG. 23 is a schematic drawing showing details of the coupling structure 43 between the control substrate 111 and the screw-fastening portion 406. Part (b) of FIG. 23 is a cross-sectional drawing of the control substrate 111 and screw-fastening portion 406 in coupling structure 43. As shown in part (b) of FIG. 23, the projection 400 is formed in a convex shape 420, so the side 400*a* contacts the solder 305, which is an example of the first conductive portion of the control substrate 111, and conducts the control substrate 111 and the screw-fastening portion 406 to the conductive portion. That is, the coupling structure 43 couples the control substrate 111 and the box sheet metal 412. Here, the screw 310 has a screw head 314 and a screw thread 315 that is inserted into the hole 340 and the screw hole 430 to fasten the control substrate 111 and the box sheet metal 412. The diameter of the hole 340 is smaller than the diameter of the screw head 314, and the diameter of the screw hole 430 is smaller than the diameter of the hole 340.

When an external electric charge is input, it flows through the screw 310 (screw member), which is an example of a coupling portion, to the metal portion 406*a* and falls to ground as in the conventional example, as shown in the current f1. In addition, a current f2 flows from the solder 305 of the control substrate 111 to the projection 400 of the screw-fastening portion 406. In other words, the current f2 is a new flow in addition to the current f1, as the charge flows through the part with low resistance. The resin layer 406*b* is peeled off beforehand by press working, and the metal portion 406*a* is exposed on the side 400*a* in a convex shape. Therefore, unlike the current f1, which varies depending on the peeling of the resin layer 406*b*, the current f2 is a stable charge flow that does not cause variations due to the peeling of the resin layer 406*b*, thus ensuring grounding stability.

As mentioned above, according to the coupling structure 43 of the present embodiment, when coupling sheet metal that has an insulating film and a metal portion, such as chrome-free steel sheet and colored steel sheet, a process is applied to ensure that the metal portion is exposed from the insulating film, and a structure is taken in which the exposed surfaces are in contact. This allows for electrically stable grounding and reduces the number of conductive members and screw member connection structures, effectively enhancing EMI reduction and ESD resistance. Therefore, electrically stable grounding can be achieved in the coupling structure 43 between sheet metals used in the image forming apparatus 1.

In addition, since many conductive members and screw member connection structures are not required, the increase in the number of parts and assembly man-hours can be suppressed.

The Fourth Embodiment

Next, the fourth embodiment of the present invention is explained in detail with reference to FIGS. 24 through 26. The present embodiment differs from the third embodiment in that it reduces the number of screws 310 that screw the control substrate 111 to the box sheet metal 512, which is an example of the second member, in a coupling structure 44. However, since the other configurations are the same as those of the third embodiment, the same codes are used and detailed explanations are omitted. If a large number of screws 310 are used, the number of parts and assembly man-hours will increase. Therefore, in the present embodiment, the number of screws 310 is reduced to reduce the number of parts and assembly man-hours while preventing poor conductivity of the control substrate 111. The coupling structure 44 couples the control substrate 111 to the box sheet metal 512.

FIG. 24 is a schematic drawing of a box sheet metal 512 of the present embodiment. The box sheet metal 512 has four screw-fastening portions 506 with screw holes (not shown) at the four corners of the box sheet metal 512, and four contact portions 530 without a screw hole at the center of each side of the box sheet metal 512. Part (a) of FIG. 25 is a schematic drawing of a contact portion 530 without a screw hole. As shown in FIG. 26, the contact portion 530 is made of a common electrogalvanized steel sheet, and the press working peels off a resin layer 506*b* to expose a metal portion 506*a*, an example of a second conductive portion with a side 500*a*, a projection 500 is formed. Similarly, the screw-fastening portion 506 has the projection 500, which is an example of a second conductive portion.

Parts (b) and (c) of FIG. 25 are cross-sectional drawings of FIG. 24 cut at the A-A line, showing the height relationship between the control substrate 111, screw-fastening portion 506, and contact portion 530. As shown in parts (b) and (c) of FIG. 25, the screw-fastening portion 506, which holds the screw 310, is 1 to 2 mm lower in height than the unscrew-fastening contact portion 530. By having different heights, for example, as shown in part (b) of FIG. 25, when the contact portion 530 is placed between the two screw-fastening portions 506, the control substrate 111 supported by the two screw-fastening portions 506 is pressed against the contact portion 530. As shown in part (c) of FIG. 25, for example, if the screw-fastening portion 506 is placed between the two contact portions 530, the control substrate 111 supported by the screw-fastening portion 506 is pressed against the contact portion 530. By making the height of the screw-fastening portion 506 lower than the height of the contact portion 530, the elasticity of the control substrate 111 presses the control substrate 111 against the contact portion 530 at 200 to 500 gf.

FIG. 26 shows a cross-sectional drawing of the control substrate 111 and contact portion 530. The contact portion 530 is pressed against the control substrate 111 by the elasticity of the control substrate 111, so the projection 500 is in constant contact with the solder 305 because of the pressing force. The pressing force on the screw-fastening portion 506 with the screws 310 is 2 to 5 kgf, which is 1/10 of the pressing force on the contact portion 530 in comparison. However, since the resin layer 506*b* has been peeled off beforehand, the current f2 can be secured if it is pressed down by a few grams. Therefore, when an external charge is input to the control substrate 111, the charge is transmitted from the copper foil 303 of the control substrate 111 to the solder 305 and flows to the projection 500 to ensure grounding.

As mentioned above, according to the coupling structure 44 of the present embodiment, when coupling sheet metal that has an insulating film and a metal portion, such as chrome-free steel sheet and colored steel sheet, a process is applied to ensure that the metal portion is exposed from the insulating film, and a structure is taken in which the exposed surfaces are in contact. This allows for electrically stable grounding and reduces the number of conductive members and screw member connection structures, effectively enhancing EMI reduction and ESD resistance. Therefore, electrically stable grounding can be realized in the coupling structure 44 between sheet metals used in the image forming apparatus 1.

In addition, since many conductive members and screw member connection structures are not required, the increase in the number of parts and assembly man-hours can be suppressed.

The Fifth Embodiment

Next, the fifth embodiment of the present invention is explained in detail with reference to FIG. 27 through part (d) of FIG. 28. The present embodiment differs from the fourth embodiment in that it further reduces the number of screws 310 that screw the control substrate 111 to the box sheet metal 612, an example of a second member, in a coupling structure 45. However, other configurations are the same as for the fourth embodiment, so the same codes are used and detailed explanations are omitted. The fewer the screw 310 screwing points are, the fewer the assembly and disassembly man-hours can be reduced. However, reducing the number of screw points increases the degree of freedom of the control substrate 111 during feeding of the image forming apparatus 1, which may cause vibration and poor conductivity. Therefore, in the present embodiment, the number of screws 310 is further reduced while preventing poor conductivity between a box sheet metal 612 and the control substrate 111. A coupling structure 45 couples the control substrate 111 to the box sheet metal 612.

FIG. 27 is a schematic drawing of a box sheet metal 612 of the present embodiment. The box sheet metal 612 has screw-fastening portions 606 with screw holes (not shown) at two of the two opposite corners, and contact portions 630 without screw holes at six other corners and the center of each side. Furthermore, the box sheet metal 612 has two control portions 640 for direct positioning of the control substrate 111.

Part (a) of FIG. 28 is a cross-sectional drawing showing the state cut at the B-B line of FIG. 27. Part (b) of FIG. 28 is a cross-sectional drawing showing the state cut along the C-C line of FIG. 27, and shows the height relationship between the control substrate 111, the screw-fastening portion 606, the contact portion 630, and the control portion 640. As shown in part (a) of FIG. 28, the screw-fastening portion 606, which is screw-fastened with screws 310, is 1 to 2 mm lower than the unscrew-fastened contact portion 630. The control portion 640 is high enough to hold the control substrate 111 in contact with the contact portion 630.

This allows, for example, the control substrate 111 to be held down from above by the control portion 640 and the screw-fastening portion 606 when the contact portion 630, the control portion 640, the contact portion 630, and the screw-fastening portion 606 are arranged from left to right, as shown in part (a) of FIG. 28. This causes the control substrate 111 to be pressed against the contact portion 630 at 200-500 gf by elasticity. In the present embodiment, since there are fewer screw-fastening portions with screws 310 than in the fourth embodiment, the control substrate 111 is regulated upward by the control section 640 to prevent it from vibrating in the vertical direction during feeding.

Parts (c) and (d) of FIG. 28 are cross-sectional drawings of FIG. 27 cut along the B-B line, showing the assembly of the control substrate 111 onto the box sheet metal 612. As shown in part (c) of FIG. 28, when coupling the control substrate 111 to the contact portion 630 of the box sheet metal 612, the control substrate 111 is pushed downward along the control portion 640 while deforming the control portion 640 in the direction of arrow C. When pushed further, as shown in part (d) of FIG. 28, the control substrate 111 sneaks into the underside of the control portion 640 and makes contact with the contact portion 630. The elastically deformed control section 640 restores its original shape. Since the control substrate 111 is on the underside of the control portion 640, the movement of the control substrate 111 is restricted even if the control substrate 111 is applied upward due to vibration, and poor conductivity between the box sheet metal 612 and the control substrate 111 can be suppressed.

As mentioned above, according to the coupling structure 45 of the present embodiment, when coupling sheet metal that has an insulating film and a metal portion, such as chrome-free steel sheet and colored steel sheet, a process is applied to ensure that the metal portion is exposed from the insulating film, and a structure is taken in which the exposed surfaces are in contact. This allows for electrically stable grounding and reduces the number of conductive members and screw member connection structures, effectively enhancing EMI reduction and ESD resistance. Therefore, electrically stable grounding can be achieved in the coupling structure 45 between sheet metals used in the image forming apparatus 1.

In addition, since many conductive members and screw member connection structures are not required, the increase in the number of parts and assembly man-hours can be suppressed.

The Sixth Embodiment

Next, the sixth embodiment of the present invention is explained in detail with reference to parts (a) and (b) of FIG. 29. The present embodiment differs from the third embodiment in its configuration in that the resin layer 33 of the sheet metal is made conductive by stretching it thin. That is, by providing a bead portion in the form of ribbed protrusions on the electrogalvanized steel sheet, the insulative layer at the leading end of the bead portion is stretched thin to make the leading end conductive, and contact portions are made at the leading end to stabilize the conductive portion. However, the other components are the same as in the third embodiment, so they will be described in detail using the same codes.

A box sheet metal 712 in the present embodiment is an example of a second member, a sheet metal made of electrogalvanized steel sheet that is box-shaped and protects the control substrate 111. To attach the control substrate 111, flanged screw-fastening portions 706 are formed at three locations on each side, for a total of eight (see the arrangement in FIG. 22). Part (a) of FIG. 29 is a schematic drawing showing the coupling structure 46 between the control substrate 111 and the screw-fastening portion 706. The screw-fastening portion 706 has a bead portion 713 of an aperture bead, an example of a second conductive portion, which is a ribbed projection, and a screw hole 730. The coupling structure 46 couples the control substrate 111 to the box sheet metal 712.

Part (b) of FIG. 29 is a cross-sectional drawing showing the coupling structure 46 between the control substrate 111 and the screw-fastening portion 706. The screw-fastening portion 706 has a metal portion **706*a* and a resin layer 706*b*. The screw-fastening portion 706 has a bead portion 713 formed by partially squeezing it into a protruding shape. In the bead portion 713, the resin layer 706*b* is stretched thin. The resistance at the bead portion 713 is sufficiently lowered to contact the bead portion 713 with the solder 305. When an external charge is input to the control substrate 111, not only does it flow through the screw 310 to the metal portion 706*a* and fall to ground as shown by the current f1, but also a new current f3 is generated to the bead portion 713**, which has a low resistance value.

The resistance and thickness of the resin layer **706*b* at the bead portion 713 are the same as in the second embodiment. That is, the resistance of the resin layer 706*b* in the bead portion 713 should be, for example, about 0.04 to 0.004Ω. In this case, the thickness of the resin layer 706*b* should be, for example, about 0.6 to 1.0 μm. That is, the bead portion 713, which is an example of a second conductive portion, has a thinner resin layer 706*b* in the box sheet metal 712 than the thickness of the resin layer 706*b* around the bead portion 713**.

Unlike current f1, which varies due to the peeling of the resin layer **706*b* when the screw 310 is stopped, the contact surface where the bead portion 713 contacts the solder 305 has a low resistance value because the resin layer 706*b* is stretched thin in advance. Therefore, a stable current f3** can be obtained with no variation, and grounding stability can be ensured.

As mentioned above, according to the coupling structure 46 of the present embodiment, since the bead portions of the resin layer stretched by press working are in contact with each other, the conductive portions that are in contact with each other are conductive, and thus conductivity is stable. This allows for electrically stable grounding and reduces the number of conductive members and screw member connection structures, effectively enhancing EMI reduction and ESD resistance. Therefore, electrically stable grounding can be realized in the coupling structure 46 between sheet metals used in the image forming apparatus 1. In addition, since many conductive members and screw member connection structures are not required, the increase in the number of parts and the number of assembly man-hours can be suppressed.

In the coupling structure 46 of the present embodiment described above, the case in which the bead portion 713 is formed by drawing to stretch the resin layer 706*b* of the screw-fastening portion 706 is described, but this is not limited to this. For example, as shown in part (a) of FIG. 30, a point-shaped protrusion 714 may be formed by squeezing as an example of a second conductive portion, or a circular or oval-shaped protrusion may be formed. Alternatively, as shown in part (b) of FIG. 30, a rectangular frame-shaped projection 715 may be formed by squeezing as an example of a second conductive portion.

OTHER EMBODIMENTS

In each of the embodiments described above, an electrogalvanized steel sheet is shown as an example as a steel sheet configuring the rear side plate 101, box sheet metal 112, etc. However, it is not limited to this and may be a colored steel sheet. Although an imaging control substrate is shown as an example as the control substrate 111 housed in the electric component box 113, it is not limited to this and can be a sheet feeding control substrate, a fax board, or a power supply board. Although the box sheet metal 112, etc. supporting the control substrate 111 is fixed to the rear side plate 101 from the rear, it may be fixed to the side plates on the front, right and left sides other than the rear side plate 101.

According to the present invention, electrically stable grounding can be realized in the coupling structure between sheet metals used in the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-151978 filed on Sep. 17, 2021, which is hereby incorporated by reference herein in its entirety.

What is claimed is:

1. A coupling method for manufacturing an image forming apparatus configured to form an image on a recording material based on an image information, comprising:

preparing a first member having a first conductive portion;

preparing a second member including a sheet metal having a metal layer and an insulative layer provided on a surface of the metal layer;

conducting a press working for the second member to form a second conductive portion in the second member, wherein the press working removes the insulative layer of the second member so that a part of the metal layer of the second member is exposed and becomes the second conductive portion; and coupling the first member and the second member in a state in which at least a part of the first conductive portion and at least a part of the second conductive portion are contacted with each other.

2. A coupling method according to claim 1, wherein the conducting the press working for the second member includes conducting a first half blanking work for the second member whereby the insulative layer is partially removed and the metal layer is exposed.

3. A coupling method according to claim 2, wherein the first half blanking work forms a projection on the second member.

4. A coupling method according to claim 3, wherein the conducting the press working for the second member further includes conducting a first press for the projection of the second member whereby a top surface of the projection collapses.

5. A coupling method according to claim 4, wherein the conducting the press working for the second member further includes conducting a second press after the first press for the projection of the second member, wherein a pressed area in the second press is wider than a pressed area in the first press.

6. A coupling method according to claim 3, wherein a projection amount of the projection on the second member is within a range from ⅓ to ⅔ of a thickness of the sheet metal of the second member.

7. A method of manufacturing an image forming apparatus, including a frame and an image forming unit supported by the frame, the method comprising:

forming the frame by coupling the first member and the second member using the coupling method according to claim 1; and disposing the image forming unit to the frame.

8. A coupling method according to claim 1, wherein the press working for the second member is conducted before the coupling the first member and the second member.

* * * * *